United States Patent
Fang et al.

(10) Patent No.: US 9,180,650 B2
(45) Date of Patent: Nov. 10, 2015

(54) CUTTING TOOL INCLUDING AN INTERNAL COOLANT SYSTEM AND FASTENER FOR A CUTTING TOOL INCLUDING AN INTERNAL COOLANT SYSTEM

(75) Inventors: X. Daniel Fang, Brentwood, TN (US); Jean-Luc Dufour, Franklin, TN (US); David J. Wills, Franklin, TN (US)

(73) Assignee: KENNAMETAL INC., Latrobe, PA (US)

( * ) Notice: Subject to any disclaimer, the term of this patent is extended or adjusted under 35 U.S.C. 154(b) by 313 days.

(21) Appl. No.: 13/036,332

(22) Filed: Feb. 28, 2011

(65) Prior Publication Data

US 2012/0087747 A1    Apr. 12, 2012

Related U.S. Application Data

(63) Continuation-in-part of application No. 12/900,544, filed on Oct. 8, 2010.

(51) Int. Cl.
| | |
|---|---|
| B23C 5/28 | (2006.01) |
| B32B 27/10 | (2006.01) |
| B23B 27/16 | (2006.01) |
| B23B 51/06 | (2006.01) |
| B23C 5/22 | (2006.01) |

(52) U.S. Cl.
CPC ............ *B32B 27/10* (2013.01); *B23B 27/1622* (2013.01); *B23B 51/06* (2013.01); *B23C 5/2221* (2013.01); *B23C 5/28* (2013.01); *B23C 2200/085* (2013.01); *B23C 2200/086* (2013.01); *B23C 2200/361* (2013.01); *B23C 2210/165* (2013.01); *Y10T 407/14* (2015.01)

(58) Field of Classification Search
USPC .................. 407/11, 48, 118, 119; 408/57, 59
IPC .......................................................... B23C 5/28
See application file for complete search history.

(56) References Cited

U.S. PATENT DOCUMENTS

| 2,422,994 A | 6/1947 | Taylor |
|---|---|---|
| 4,779,440 A | 10/1988 | Cleve et al. |

(Continued)

FOREIGN PATENT DOCUMENTS

| DE | 3740814 A1 | 6/1989 |
|---|---|---|
| DE | 19703848 A1 | 7/1998 |

(Continued)

OTHER PUBLICATIONS

You Tube, "The Story Behind Kennametal's Beyond Blast", dated Sep. 14, 2010, http://www.youtube.com/watch?v=8_A-bYVwmU8 (3 pages) accessed on Oct. 14, 2010.

(Continued)

*Primary Examiner* — Sunil K Singh
*Assistant Examiner* — Alan Snyder
(74) *Attorney, Agent, or Firm* — Larry R. Meenan

(57) ABSTRACT

A cutting insert fastener adapted to secure a cutting insert to a cutting tool holder. The fastener comprises a fastener head portion comprising at least one feature adapted to direct a coolant fluid to an insert cutting edge of a cutting insert when the cutting insert is secured to a cutting tool holder by the cutting insert fastener. Cutting tools comprising internal coolant systems and fastened with a cutting insert fastener comprising a fastener head portion with at least one feature adapted to direct a coolant fluid to an insert cutting edge are also disclosed.

19 Claims, 17 Drawing Sheets

(56) References Cited

U.S. PATENT DOCUMENTS

| | | | |
|---|---|---|---|
| 5,116,659 | A | 5/1992 | Glatzle et al. |
| 5,541,006 | A | 7/1996 | Conley |
| 5,543,235 | A | 8/1996 | Mirchandani et al. |
| 5,601,857 | A | 2/1997 | Friedrichs |
| 5,697,046 | A | 12/1997 | Conley |
| 5,947,660 | A | 9/1999 | Karlsson |
| 6,053,669 | A | 4/2000 | Lagerberg |
| 6,086,980 | A | 7/2000 | Foster et al. |
| 6,248,277 | B1 | 6/2001 | Friedrichs |
| 6,344,265 | B1 * | 2/2002 | Blomstedt et al. ............ 428/216 |
| 6,450,739 | B1 | 9/2002 | Puide et al. |
| 6,511,265 | B1 | 1/2003 | Mirchandani et al. |
| 6,706,327 | B2 | 3/2004 | Blomstedt et al. |
| 6,957,933 | B2 | 10/2005 | Pachao-Morbitzer et al. |
| 7,125,207 | B2 | 10/2006 | Craig et al. |
| 7,537,422 | B2 | 5/2009 | Ballas et al. |
| 7,611,310 | B2 | 11/2009 | Isaksson |
| 7,621,700 | B2 | 11/2009 | Jonsson et al. |
| 7,625,157 | B2 | 12/2009 | Prichard et al. |
| 7,802,945 | B2 | 9/2010 | Sheffler et al. |
| 7,802,947 | B2 | 9/2010 | Endres |
| 7,883,299 | B2 | 2/2011 | Prichard et al. |
| 7,883,784 | B2 | 2/2011 | Apte et al. |
| D635,164 | S | 3/2011 | Nelson et al. |
| 7,931,425 | B2 | 4/2011 | Morrison et al. |
| D638,452 | S | 5/2011 | Morrison et al. |
| D640,717 | S | 6/2011 | Morrison et al. |
| 7,963,729 | B2 | 6/2011 | Prichard et al. |
| 7,997,832 | B2 | 8/2011 | Prichard et al. |
| 8,033,763 | B2 | 10/2011 | Prichard et al. |
| 8,047,748 | B2 | 11/2011 | Endres |
| 8,057,130 | B2 | 11/2011 | Prichard et al. |
| 8,066,457 | B2 | 11/2011 | Buettiker et al. |
| 8,079,783 | B2 | 12/2011 | Prichard et al. |
| 8,079,784 | B2 | 12/2011 | Prichard et al. |
| 8,092,123 | B2 | 1/2012 | Prichard et al. |
| 8,137,034 | B2 | 3/2012 | Noureddine |
| 8,142,112 | B2 | 3/2012 | Prichard et al. |
| D658,218 | S | 4/2012 | Morrison et al. |
| 8,202,025 | B2 | 6/2012 | Prichard et al. |
| 8,215,878 | B2 | 7/2012 | Rozzi et al. |
| 8,256,998 | B2 | 9/2012 | Prichard et al. |
| 8,256,999 | B2 | 9/2012 | Prichard et al. |
| 8,328,471 | B2 | 12/2012 | Nelson et al. |
| 2006/0288820 | A1 | 12/2006 | Mirchandani et al. |
| 2008/0175676 | A1 | 7/2008 | Prichard et al. |
| 2008/0175679 | A1 | 7/2008 | Prichard et al. |
| 2009/0123244 | A1 * | 5/2009 | Buettiker et al. ............ 408/233 |
| 2009/0320655 | A1 | 12/2009 | Grant |
| 2010/0172704 | A1 | 7/2010 | Nelson |
| 2010/0239377 | A1 | 9/2010 | Morrison et al. |
| 2011/0020072 | A1 | 1/2011 | Chen et al. |
| 2011/0020073 | A1 | 1/2011 | Chen et al. |
| 2011/0020074 | A1 | 1/2011 | Chen et al. |
| 2011/0020075 | A1 | 1/2011 | Prichard et al. |
| 2011/0020076 | A1 | 1/2011 | Prichard et al. |
| 2011/0229277 | A1 | 9/2011 | Hoffer et al. |
| 2012/0087746 | A1 | 4/2012 | Fang et al. |
| 2012/0087747 | A1 | 4/2012 | Fang et al. |
| 2013/0017024 | A1 | 1/2013 | Höfermann |
| 2013/0183107 | A1 | 7/2013 | Fang et al. |

FOREIGN PATENT DOCUMENTS

| | | |
|---|---|---|
| EP | 0100376 A2 | 2/1984 |
| EP | 0599393 A1 | 6/1994 |
| EP | 0842722 A1 | 5/1998 |
| EP | 1065021 A1 | 1/2001 |
| FR | 2928284 A1 | 9/2009 |
| GB | 2218931 A | 11/1989 |
| JP | 8-39387 A | 2/1996 |
| JP | 2006-55916 | 3/2006 |
| JP | 2006-55917 | 3/2006 |
| SE | 0950092 A1 | 6/2010 |
| WO | WO 92/22390 A1 | 12/1992 |
| WO | WO 97/27018 A1 | 7/1997 |
| WO | WO 98/28455 A1 | 7/1998 |
| WO | WO 99/39853 A1 | 8/1999 |
| WO | WO 01/43899 A1 | 6/2001 |
| WO | WO 2007/003248 A1 | 1/2007 |
| WO | WO 2007/085281 A1 | 8/2007 |
| WO | WO 2010/096014 A1 | 8/2010 |

OTHER PUBLICATIONS

Kennametal press release dated Jun. 10, 2010, http://news.thomasnet.com/companystory/Kennametal-Launches-Beyond-BLAST-TM-at-IMTS-2010-Booth-W-1522-833445 (2 pages) accessed on Oct. 14, 2010.

Pages from Kennametal site, https://www.kennametal.com/en-US/promotions/Beyond_Blast.jhtml (7 pages) accessed on Oct. 14, 2010.

Restriction Requirement mailed Jul. 24, 2008 in U.S. Appl. No. 11/167,811.

Non-Final Rejection mailed Oct. 21, 2008 in U.S. Appl. No. 11/167,811.

Final Rejection mailed Jun. 12, 2009 in U.S. Appl. No. 11/167,811.

Non-Final Rejection mailed Aug. 28, 2009 in U.S. Appl. No. 11/167,811.

Final Rejection mailed Mar. 2, 2010 in U.S. Appl. No. 11/167,811.

Advisory Action mailed May 12, 2010 in U.S. Appl. No. 11/167,811.

Non-Final Rejection mailed Aug. 19, 2010 in U.S. Appl. No. 11/167,811.

Final Rejection mailed Feb. 3, 2011 in U.S. Appl. No. 11/167,811.

Office Action mailed Nov. 21, 2012 in U.S. Appl. No. 12/900,544.

Office Action mailed Mar. 22, 2013 in U.S. Appl. No. 12/900,544.

Notice of Allowance mailed Jun. 3, 2013 in U.S. Appl. No. 12/900,544.

Notice of Allowance mailed Sep. 13, 2013 in U.S. Appl. No. 12/900,544.

Office Action mailed Oct. 10, 2013 in U.S. Appl. No. 13/785,375.

PCT International Preliminary Report on Patentability PCT/US2011/051288 mailed Apr. 9, 2013 (7 pages).

PCT International Search Report PCT/US2011/051288 mailed Apr. 9, 2013 (5 pages).

PCT Written Opinion of the International Searching authority PCT/US2011/051288 (6 pages).

PCT International Preliminary Report on Patentability PCT/US2011/051281 mailed Apr. 9, 2013 (7 pages).

PCT International Search Report PCT/US2011/051281 mailed Apr. 9, 2013 (5 pages).

PCT Written Opinion of the international Searching Authority PCT/US2011/051281 mailed Apr. 9, 2013 (6 pages).

* cited by examiner

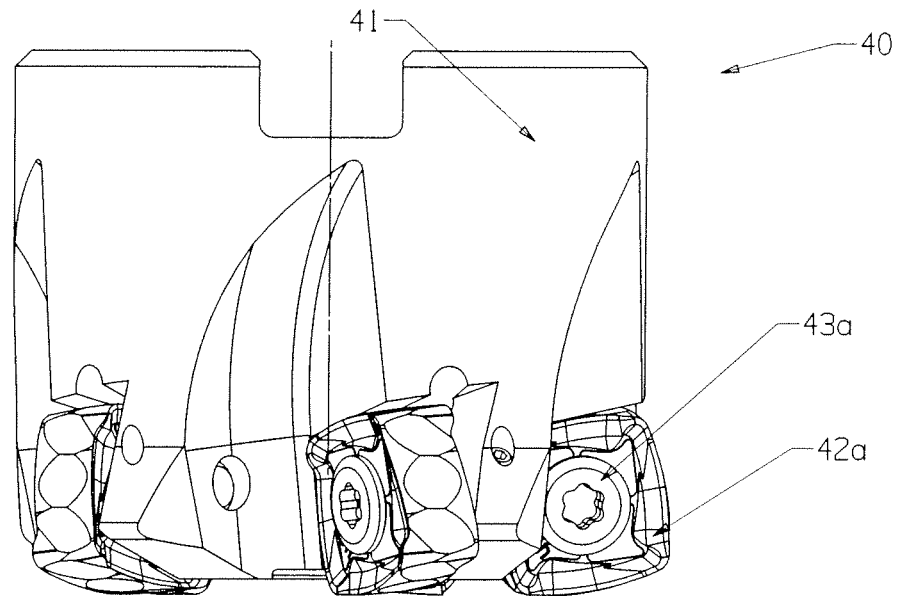
FIG. 2(a)
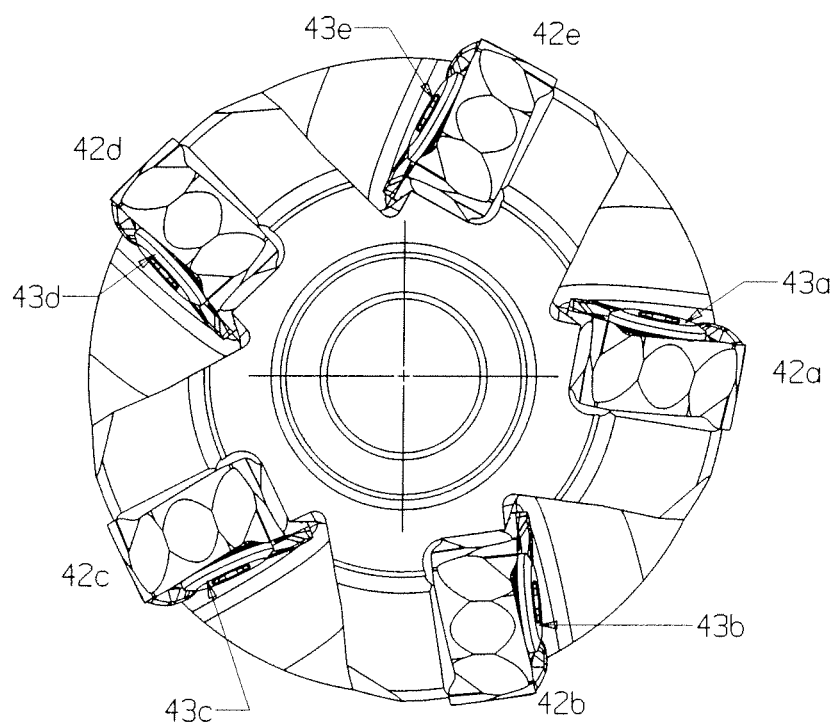
FIG. 2(b)
FIGURE 2

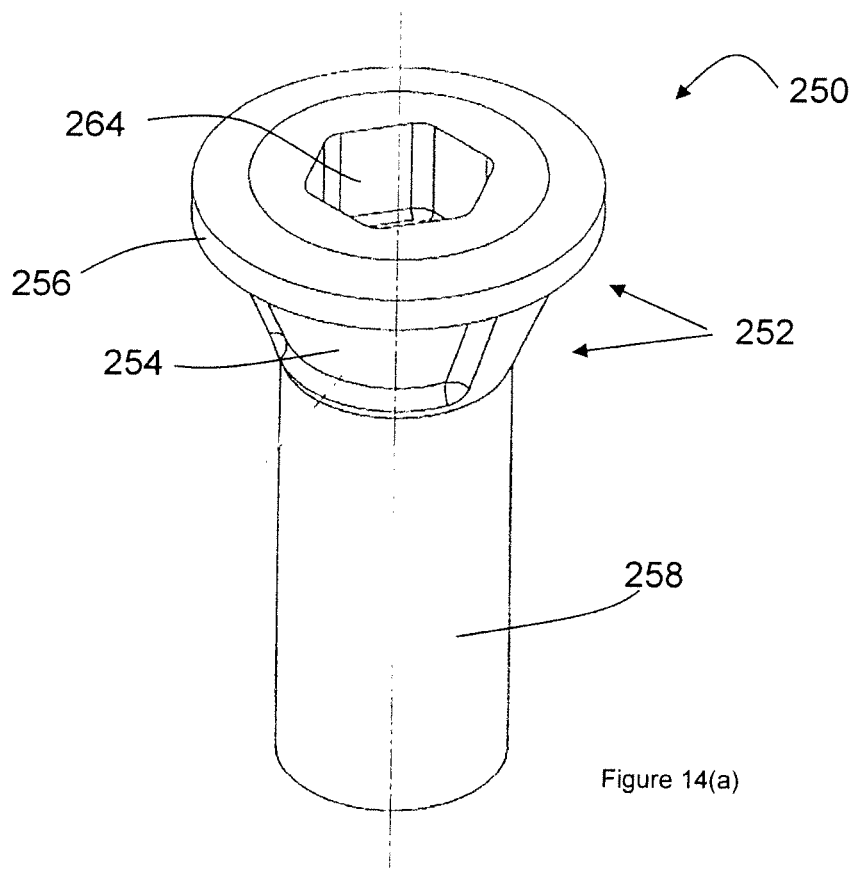
Figure 14(a)
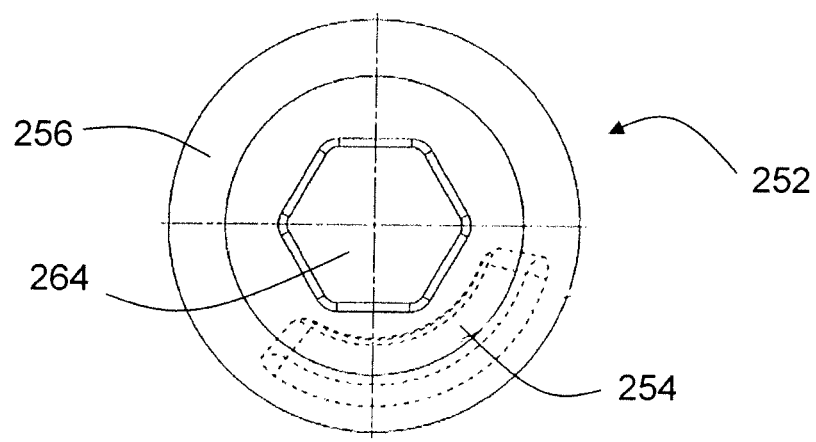
Figure 14(b)
Figure 14

Section V - V       Figure 15(b)

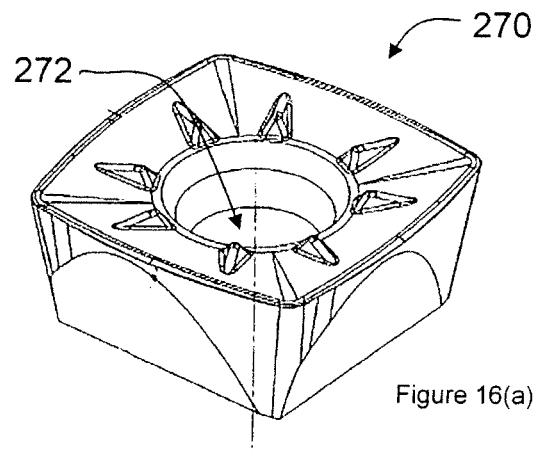
Figure 16(a)
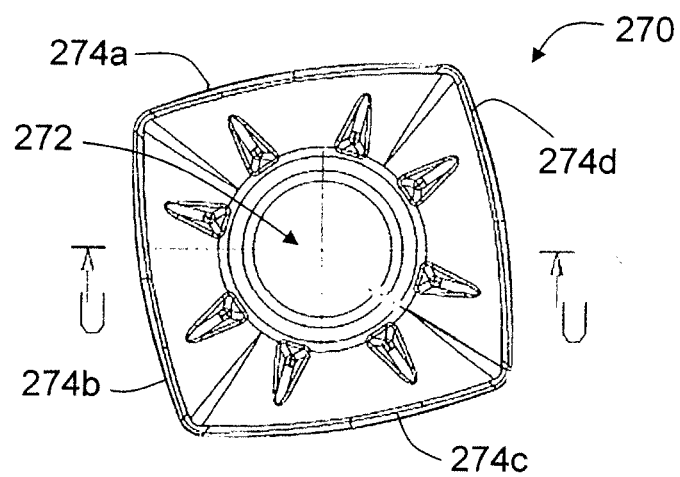
Figure 16(b)
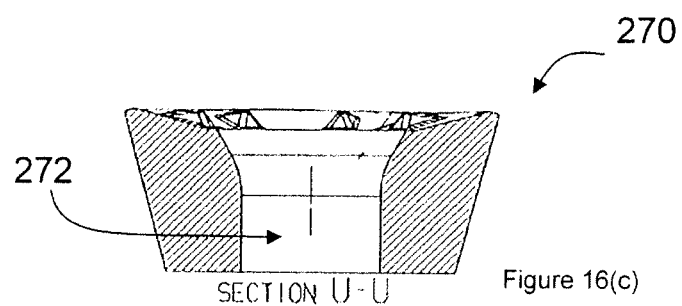
SECTION U-U
Figure 16(c)
*PRIOR ART*
Figure 16

CUTTING TOOL INCLUDING AN INTERNAL COOLANT SYSTEM AND FASTENER FOR A CUTTING TOOL INCLUDING AN INTERNAL COOLANT SYSTEM

CROSS-REFERENCE TO RELATED APPLICATIONS

This application claims priority under 35 U.S.C. §120 as a continuation-in-part of co-pending U.S. patent application Ser. No. 12/900,544, filed Oct. 8, 2010, entitled "Cutting Tools and Cutting Inserts including Internal Cooling", the entire contents of which are incorporated herein in its entirety.

BACKGROUND OF THE TECHNOLOGY

1. Field of the Technology

The present disclosure relates to cutting tools and fasteners for cutting inserts for machining metallic materials.

2. Description of the Background of the Technology

As used herein, the term "metal cutting" broadly refers to machining, turning, milling, drilling, boring, planing, shaping, reaming, and like material removal operations performed on metallic (i.e., metal and metal alloy) materials. Cutting tools used in metal cutting typically are subjected to high loads and high temperatures. During metal cutting, the cutting tool applies a high load to the metallic workpiece to deform the workpiece. Because of the relative motion of the workpiece and the cutting edge of the cutting tool, shear deformation is produced in the metallic workpiece, generating metal chips from the workpiece. A cutting tool tip or cutting insert will generally include a rake face, which is a portion of the tip or insert that encounters and further deforms chips after the chips are formed at the cutting edge of the tip or insert. Cutting inserts may also include additional features that control chip size and shape. The chips produced in metal cutting are hot from deformation and frictional forces and are in close contact for a time with the cutting tip or cutting insert.

Because cutting inserts experience high loads and frictional contact with the workpiece and the machined chips, the cutting insert, and particularly the insert's cutting edge, is heated to very high temperatures. For example, cemented carbide cutting inserts may be heated to temperatures greater than 1,800° F. (982° C.) during cutting of hard steels. High cutting insert temperatures increase wear during metal cutting and, thus, reduce cutting insert service life. Machine tool operators can reduce tool speed to at least partially counteract high temperature-induced cutting insert wear. Reducing tool speed, however, may adversely affect the finish quality of machined surfaces produced on a metallic workpiece. Instead, a coolant is typically used to cool the cutting edge of a cutting insert during metal cutting.

Metal cutting coolants, which are also referred to as cutting fluids, serve to lubricate the workpiece and reduce frictional forces at low cutting speeds. At higher cutting speeds, coolants predominantly act to cool the workpiece and the cutting insert, and assist in flushing chips away from the cutting insert. The use of coolants in metal cutting significantly increases cutting insert service life, reduces unintended deformation of the workpiece, improves surface finish quality, and enhances chip removal and handling.

Traditionally, coolants are fed from an external source to the region of the interface between the cutting edge of a cutting insert and the workpiece. For example, a flow of coolant may be flooded onto both the workpiece and cutting insert through tubing from an external coolant source. Another method of applying coolant to the cutting edge/workpiece interface region is to direct a jet of coolant at the interface region. Still another method of applying coolant involves misting a coolant with an air jet and directing the mist at the cutting edge/workpiece interface region.

Conventional methods of applying coolants to a cutting edge/workpiece interface region are inefficient. For example, an excess amount of expensive coolant typically is applied during metal cutting to better ensure that coolant will contact the interface region and remove heat from the cutting insert's cutting edge. However, although excess coolant is applied, because of the tight tolerances at the interface region and the continuous generation of chips at the interface, less than an optimal amount of coolant is delivered to the interface region to efficiently and effectively reduce the temperature of the cutting insert's cutting edge. As such, the operating temperature of the cutting insert's cutting edge may remain very high, reducing cutting insert service life.

Accordingly, a need exists for an improved arrangement for reducing the temperature of the cutting edge of a metal cutting insert during cutting operations. In particular, a need exists for an improved system to deliver coolant to the cutting edge/workpiece interface during cutting operations.

SUMMARY

An aspect according to the present disclosure is directed to a cutting insert comprising at least one cutting edge and at least one fastener bore adapted to accept a fastener for removably securing the cutting insert to a tool holder. The fastener bore includes at least one coolant flow recess adapted to direct a coolant through the coolant flow recess and toward the at least one cutting edge when the cutting insert is secured to the tool holder by a fastener.

An additional aspect according to the present disclosure is directed to a cutting tool comprising a cutting insert, a tool holder, and a fastener. The cutting insert comprises at least one cutting edge and at least one fastener bore adapted to accept a fastener for removably securing the cutting insert to the tool holder. The at least one fastener bore includes at least one coolant flow recess adapted to direct a coolant through the coolant flow recess and toward a head portion of the fastener when the cutting insert is secured to the tool holder by the fastener. The tool holder comprises at least one insert pocket adapted to accept the cutting insert and allow the cutting insert to be secured to the tool holder by the fastener. The tool holder further comprises at least one coolant bore adapted to direct coolant from the tool holder to the at least one coolant flow recess of the fastener bore. The head portion of the fastener and the coolant flow recess of the fastener bore define a gap that directs coolant toward the cutting edge of the cutting insert.

An additional aspect according to the present disclosure is directed to a cutting insert including an internal coolant system, wherein the cutting insert comprises at least one cutting edge, at least one fastener bore adapted to accept a fastener for removably fastening the cutting insert to a tool holder, and at least one through cavity positioned adjacent to the fastener bore. The at least one through cavity extends from a top face of the cutting insert to a bottom face of the cutting insert and is adapted to direct a coolant fluid through the cutting insert and toward the at least one cutting edge when the cutting insert is fastened to a tool holder by a fastener.

Yet an additional aspect according to the present disclosure is directed to a cutting tool comprising a cutting insert, a tool holder, and a fastener. The cutting insert comprises at least one cutting edge, at least one fastener bore adapted to accept a fastener for removably fastening the cutting insert to the tool holder, and at least one through cavity adapted to direct a coolant through the cutting insert and toward a head portion of the fastener when the cutting insert is fastened to the tool holder by the fastener. The tool holder comprises at least one coolant bore adapted to direct a coolant from the tool holder to the at least one through cavity of the cutting insert. The head portion of the fastener and the at least one through cavity of the cutting insert define a gap that directs coolant to the at least one cutting edge of the cutting insert.

Still another aspect according to the present disclosure is directed to a fastener adapted to secure a cutting insert to a tool holder. The fastener comprises a head portion including at least one feature adapted to direct a coolant fluid toward a cutting edge of a cutting insert secured to a tool holder by the fastener. In a non-limiting embodiment, the at least one feature of the head portion includes at least one recess adapted to direct a coolant fluid toward a cutting edge of a cutting insert secured to a tool holder by the fastener. In another non-limiting embodiment, the at least one feature of the head portion includes a lip portion adapted to direct a coolant fluid toward a cutting edge of a cutting insert secured to a tool holder by the fastener.

Yet another aspect according to the present disclosure is directed to a cutting tool comprising a tool holder, a cutting insert, and a fastener. The tool holder includes a coolant bore. The cutting insert includes a cutting edge and a fastening bore. The fastener is adapted to secure the cutting insert to the tool holder, and the fastener comprises a head portion. When the cutting insert is secured to the tool holder by securing the fastener through the fastening bore, the fastening bore and the fastener together define a cavity fluidly communicating with the coolant bore. The cavity is adapted to direct a coolant through the cutting insert and toward the head portion. The head portion of the fastener includes at least one feature adapted to direct the coolant toward the cutting edge of the cutting insert. In a non-limiting embodiment, the at least one feature of the head portion includes at least one recess adapted to direct the coolant toward the cutting edge of the cutting insert. In another non-limiting embodiment, the at least one feature of the head portion includes a lip portion adapted to direct the coolant toward a cutting edge of a cutting insert secured to a tool holder by the fastener.

BRIEF DESCRIPTION OF THE DRAWINGS

The features and advantages of methods described herein may be better understood by reference to the accompanying drawings in which:

FIGS. 2(a) and 2(b) are a schematic side view and a schematic end view, respectively, of a non-limiting embodiment of a cutting (milling) tool according to the present disclosure, showing multiple cutting inserts secured in the holder of the cutting tool with multiple fasteners;

FIG. 14(a) is a perspective view of a non-limiting embodiment of a fastener according to the present disclosure comprising a recess on a head portion of the fastener;

FIG. 14(b) is a top view of the fastener depicted in FIG. 14(a);

FIG. 16(a) is a perspective view of a prior art indexable cutting insert;

FIG. 16(b) is a top view of the cutting insert depicted in FIG. 16(a);

FIG. 16(c) is a cross-sectional view of the cutting insert depicted in FIGS. 16(a) and 16(b) taken at line U-U in FIG. 16(b);

Figure 1:
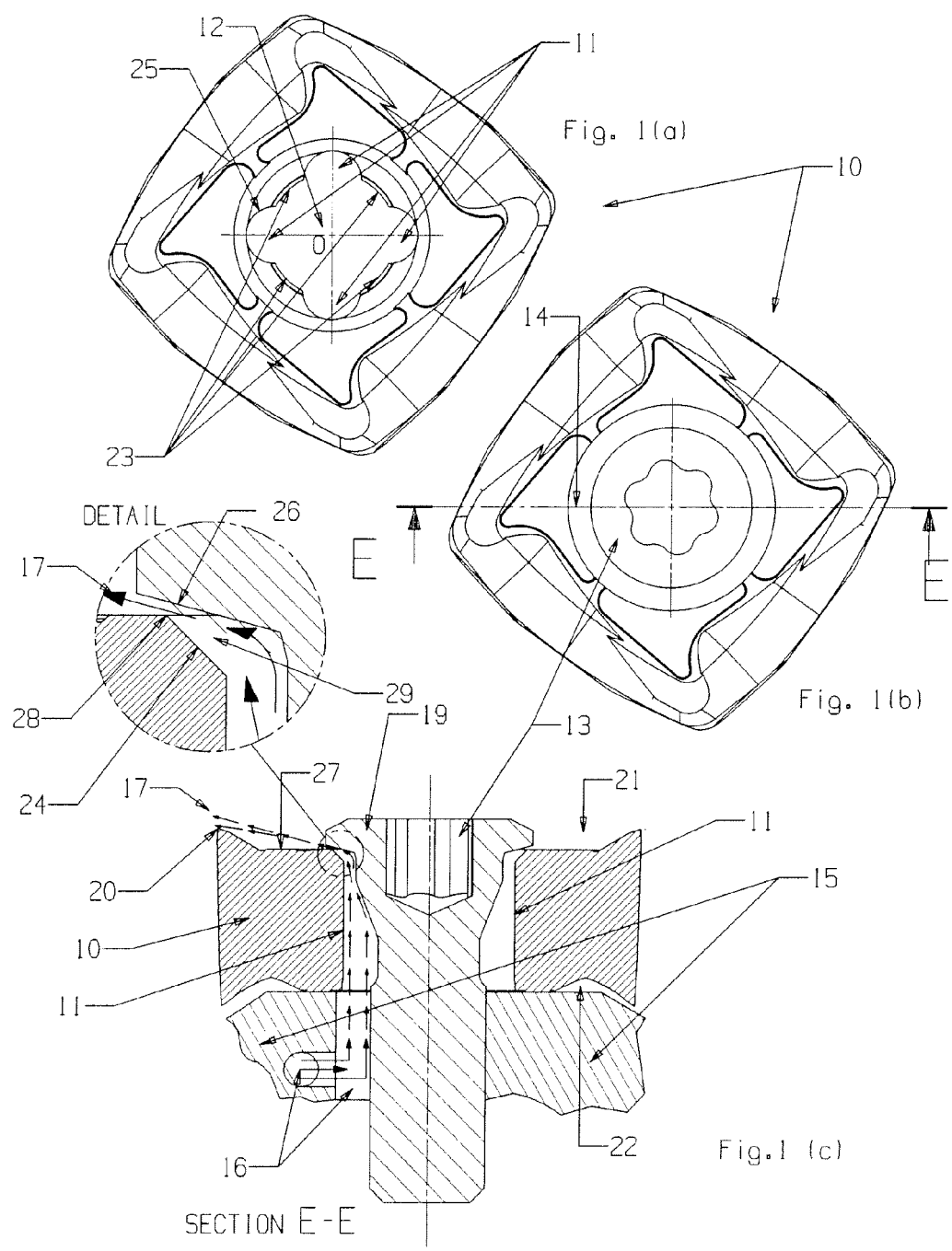
FIG. 1(a) is a schematic top view of a non-limiting embodiment of a double-sided milling cutting insert according to the present disclosure including four coolant flow recesses.
FIG. 1(b) is a schematic top view of a non-limiting embodiment of the double-sided milling cutting insert of FIG. 1(a) and a fastener according to the present disclosure.
FIG. 1(c) is a schematic cross-section of a non-limiting embodiment of a cutting insert, a fastener, and a portion of a tool holder according to the present disclosure, revealing coolant flow recesses in the fastener bore of the cutting insert and coolant flow guided by a head portion of the fastener.

The reader will appreciate the foregoing details, as well as others, upon considering the following detailed description of certain non-limiting embodiments of cutting tools, tool holders, and cutting inserts according to the present disclosure.

DETAILED DESCRIPTION OF CERTAIN NON-LIMITING EMBODIMENTS

In the present description of non-limiting embodiments, other than in the operating examples or where otherwise indicated, all numbers expressing quantities or characteristics are to be understood as being modified in all instances by the term "about". Accordingly, unless indicated to the contrary, any numerical parameters set forth in the following description are approximations that may vary depending on the desired properties one seeks to obtain in the cutting tools, tool holders, and cutting inserts according to the present disclosure. At the very least, and not as an attempt to limit the application of the doctrine of equivalents to the scope of the claims, each numerical parameter should at least be construed in light of the number of reported significant digits and by applying ordinary rounding techniques.

Any patent, publication, or other disclosure material that is said to be incorporated, in whole or in part, by reference herein is incorporated herein only to the extent that the incorporated material does not conflict with existing definitions, statements, or other disclosure material set forth in the present disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

A non-limiting aspect according to the present disclosure is directed to an improved cutting insert that is adapted to internally channel, divert, and/or direct a coolant (i.e., a cutting fluid) through the cutting insert and toward a cutting edge of the cutting insert. By internally directing coolant to the cutting edge, the ability to remove heat from the cutting edge is improved. The improvement in removing heat from the cutting edge made possible by the present invention reduces the quantity of coolant needed during metal cutting, may allow for increased cutting speeds, reduces frictional heating, and increases the service life of cutting inserts.

FIG. 1(a) is a schematic top view of a non-limiting embodiment of a double-sided milling cutting insert 10 according to the present disclosure including four coolant flow recess 11 provided by removing material from a wall of the fastener bore 12 of the cutting insert 10. The center point of the fastener bore 12 is identified as point "O". FIG. 1(b) is a schematic top view of the double-sided milling cutting insert 10 shown in FIG. 1(a) and with a fastener 13 disposed in the fastener bore 12 of the cutting insert to secure the cutting insert 10 on a milling tool holder (not shown in FIG. 1(b)). FIG. 1(c) is a sectional view taken at line E-E in FIG. 1(b) (center line 14), which passes along the longitudinal axis of fastener 13, showing the cutting insert 10 on a milling tool holder 15 including internal coolant bore 16. The flow of coolant is depicted by the series of arrows 17. The coolant flow 17 passes through the tool holder 15, and emerges from coolant bore 16, passes through the cutting insert 10, and is guided by the head portion 19 of the fastener 13 towards the cutting edge 20 of the cutting insert 10 that is positioned to contact a workpiece during the milling operation.

As can be seen from FIGS. 1(a) through 1(c), cutting insert 10 comprises at least one fastener bore 12 adapted to accept a fastener 13. The fastener 13 removably secures the cutting insert 10 to tool holder 15. Fastener bore 12 comprises a plurality of coolant flow recesses 11 in the fastener bore 12, extending axially along the fastener bore 12. The coolant flow recesses 11 are adapted to direct a coolant along the coolant flow recesses 11 and the fastener 13 and toward at least one cutting edge 20 of the cutting insert 10 when the cutting insert 10 is secured to a tool holder by a fastener 13 disposed through the fastener bore 12.

The coolant flow recesses 11 may be formed by cutting or otherwise removing material from the original wall or surface 23 of the fastener bore 12. Alternatively, the coolant flow recesses 11 may be built into the tooling dies and created when the cutting insert 10 is pressed in a mold or extruded in an injection machine. The coolant flow recesses 11 extend from the top face 21 of the cutting insert 10 to the bottom face 22 of the cutting insert 10. The fastener 13 is in physical contact with the cutting insert 10 at the remaining regions of the fastener bore surface 23 and secures the cutting insert 10 to the tool holder 15. In non-limiting embodiments, the cutting insert 10 includes a chamfer 24 (see detail portion of FIG. 1(c)) at the top face 21 and/or at the bottom face 22. In non-limiting embodiments, the profile 25 of a coolant flow recess 11 may be of any geometry, including, but not limited to a portion of circle, a portion of an ellipse, a line, a curve, a spline, a polygon, or any combination of these geometries.

As shown in FIG. 1(c), the fastener 13 serves a function in addition to securing the cutting insert 10 in the fastener bore 12 and to the tool holder 15. In particular, the fastener 13 guides or directs the coolant flow 17 to the active cutting edge 20 in action. As used herein, a cutting edge that is "active" is oriented on a tool holder so that the cutting edge contacts a workpiece during machining operations. Again referring to the detail portion of FIG. 1(c), a bottom face 26 of the head portion 19 and the top edge 28 of the fastener bore 12 define a peripheral gap 29. Coolant flows through the gap 29 and is directed towards the active cutting edge 20. The peripheral gap 29 functions as a coolant outlet that is defined between the bottom face 26 of the head portion 19 and the top portion of the fastener bore 12, including the top edge 28 and chamfer 24.

The peripheral gap 29 may be specifically shaped to account for the type and configuration of the cutting insert 10. For example, the bottom face 26 of the head portion 19 may be parallel to a flat plateau 27 on the top face 21 of a cutting insert. Such a design is advantageous if the cutting edge of the cutting insert and the top edge of the fastener bore are at about the same level (when the cutting insert is in an orientation as shown in FIG. 1(c)). Alternatively, for example, the bottom face 26 of the head portion 19 may be angled downwardly with respect to a flat plateau 27 on the top face 21 of a cutting insert in designs wherein the cutting edge is below the top edge of the fastener bore (when the cutting insert is in an orientation as shown in FIG. 1(c)). According to another alternative, for example, the bottom face 26 of the head portion 19 may be angled upwardly with respect to a flat plateau 27 on the top face 21 of the cutting insert in designs wherein the cutting edge is generally above the top edge of the fastener bore, which is the specific design shown in the non-limiting embodiment of FIG. 1(c).

As described hereinabove and shown in FIGS. 1(a) through 1(c), in a non-limiting embodiment of the present disclosure, an internal coolant system for cutting inserts comprises a cutting insert 10, a fastener 13, and a tool holder 15. The wall of the fastener bore 12 is partially cut out to form multiple coolant flow recesses 11. A bottom face 26 of the head portion 19 of the fastener 13 has a predetermined geometrical relationship with the top edge 28 and chamfer 24 of the fastener bore 12 when the fastener 13 is positioned to secure the cutting insert 10 in the fastener bore 12 and tool holder 15, thereby providing a gap 29. A coolant flow recess 11 and a gap 29 provide a channel for coolant to flow from one or more internal coolant bores 16 in the tool holder 15 to the interface between the fastener bore 12 and the fastener 13. The bottom face 26 of the head portion 19 may be specifically designed to account for the type and configuration of the cutting insert 10 to thereby specifically direct the coolant flow 17 to the active cutting edge 20 along the shortest possible distance. The non-limiting embodiments of internal coolant systems for cutting inserts described herein are unique, yet simple in design, effective, and economical. The fastener 13 provides the dual functions of (i) securing the cutting insert 10 to the tool holder 15; and (ii) guiding, channeling, and/or directing coolant precisely toward the active cutting edge 20.

In the non-limiting embodiment of a cutting insert depicted as cutting insert 10 in FIGS. 1(a) through 1(c), the cutting insert 10 includes four cutting edges 20. However, it is within the scope of the present disclosure to provide a cutting insert 10 having any number of cutting edges 20 (for example, a round insert with a single cutting edge, or cutting inserts with three, five, or more cutting edges) with the improved coolant delivery features described herein. Further, in the non-limiting embodiment depicted in FIGS. 1(a) through 1(c), the at least one fastener bore 12 is centrally positioned on a side of cutting insert 10. However, it is within the scope of the present disclosure that the fastener bore is not centrally positioned, but rather is in any other suitable position on the cutting insert and/or that the cutting insert may include more than one fastener bore. In a non-limiting embodiment, the fastener 13 is threadedly received in the tool holder 15.

Optionally, the cutting insert 10, along with other embodiments of cutting inserts according to the present disclosure, may comprise one or more rake faces and chip control features, and any other cutting insert features known to a person having ordinary skill in the art. Such features are conventional and are known to those having ordinary skill in the art. Thus, they are not further discussed herein.

Cutting insert 10 may be made from any material suitable for the cutting operations for which the insert 10 is intended. In certain non-limiting embodiments, the cutting insert 10, along with other embodiments of cutting inserts according to the present disclosure, is manufactured from one or more materials selected from high speed steel, cobalt alloys, cemented carbides, cermets, ceramics, diamond, and polycrystalline diamond. In various embodiments of cutting inserts according to the present disclosure, the cutting inserts comprise any material known to a person skilled in the art that is used now or hereinafter for the manufacture of cutting inserts.

In certain non-limiting embodiments, the cutting insert 10, along with other embodiments of cutting inserts according to the present disclosure, comprises a wear coating, which may be a wear coating composed of single or multiple layers. Examples of non-limiting embodiments of possible wear coatings include one or more of titanium nitride, titanium carbide, aluminum oxide, silicon nitride, and zirconium oxide. In various embodiments of cutting inserts according to the present disclosure, the cutting inserts include coatings of any suitable materials known to a person skilled in the art that is used now or hereinafter for wear coatings on cutting inserts.

According to a non-limiting aspect of the present disclosure, a cutting tool including an internal coolant system comprises: a cutting insert including at least one internal coolant flow recess adapted to channel, divert, and/or direct a coolant (i.e., a cutting fluid) toward at least one active cutting edge of the cutting insert; a tool body adapted to pass coolant through the tool body and into at least one of the internal coolant flow recesses of the cutting insert, and then on to or towards at least one active cutting edge of the cutting insert. By internally directing coolant to the cutting edge, smaller quantities of coolant are required for metal cutting, cutting speeds may be increased, and frictional heating is reduced, resulting in longer cutting insert life.

FIG. 2(a) depicts a side view of a non-limiting embodiment of a cutting tool 40 according to the present disclosure, and FIG. 2(b) depicts a front-end view of the cutting tool 40. The cutting tool 40 comprises: a milling tool holder 41 including a coolant delivery system that is substantially similar in design to the system shown in FIG. 1(c); five indexable cutting inserts 42a through 42e, which are substantially similar in design to the cutting insert 10 described above and shown in FIGS. 1(a) through 1(c); and five fasteners 43a through 43e, which are substantially similar in design to fastener 13 described above and shown in FIGS. 1(b) and 1(c). In a non-limiting embodiment the fasteners 43a through 43e are threadedly received in the tool holder 41.

Figure 3:
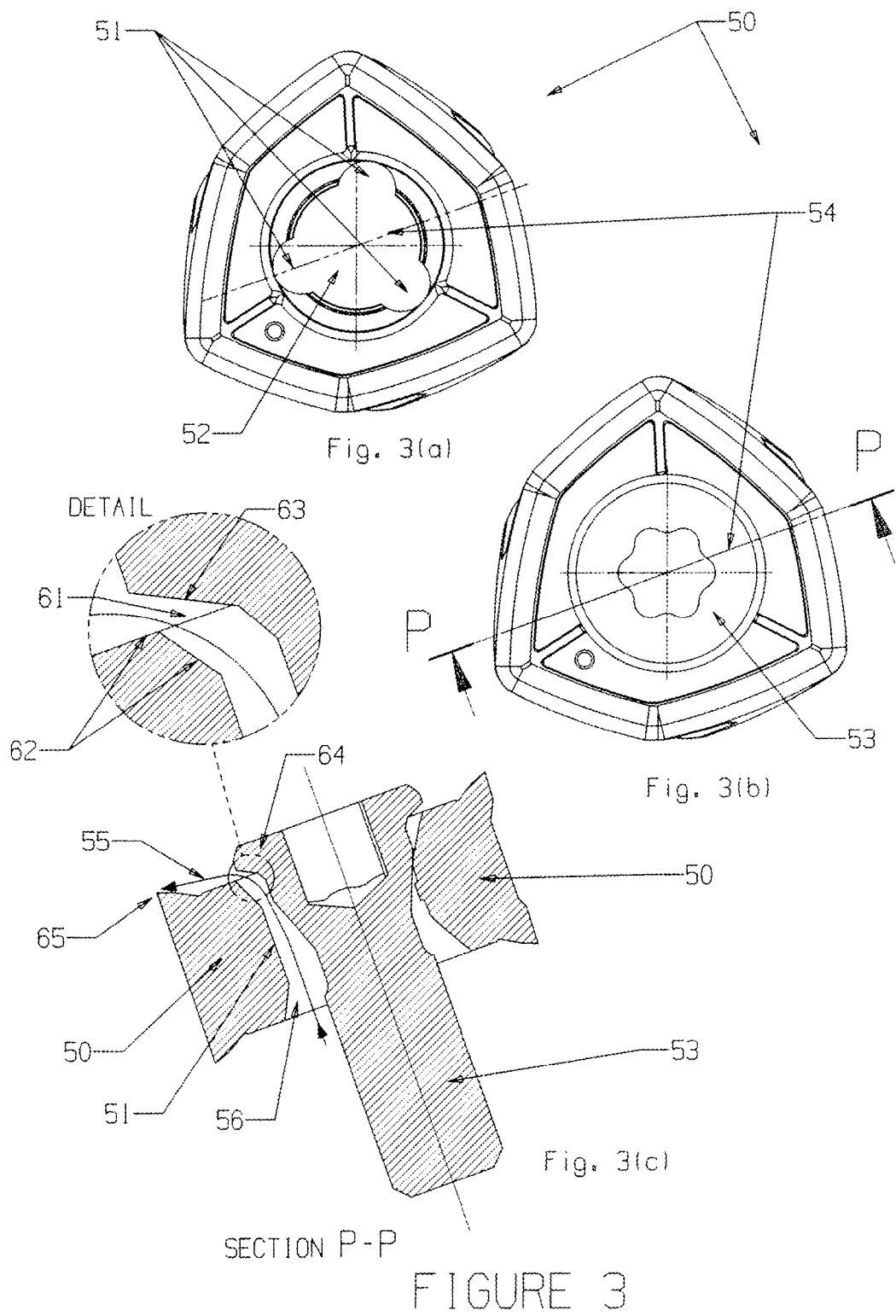
FIG. 3(a) is a schematic top view of a non-limiting embodiment of a double-sided milling cutting insert according to the present disclosure including three coolant flow recesses.
FIG. 3(b) is a schematic top view of the double-sided milling cutting insert of FIG. 3(a) and a fastener according to the present disclosure.
FIG. 3(c) is a schematic cross-section of a non-limiting embodiment of a cutting insert, a fastener, revealing coolant flow recesses in the fastener bore of the cutting insert and coolant flow guided by a head portion of the fastener.

FIGS. 3(a) through 3(c) illustrate another non-limiting embodiment of a double-sided milling cutting insert 50 including an internal coolant system according to the present disclosure. FIG. 3(a) depicts a top view of the cutting insert 50 including three coolant flow recesses 51 formed along a wall of the fastener bore 52. FIG. 3(b) depicts a top view of the cutting insert 50 and further depicts a fastener 53 disposed in the fastener bore 52. FIG. 3(c) depicts a sectioned view of cutting insert 50 and fastener 52 taken along line P-P (also identified as line 54) in FIG. 3(b). The sectioned view of FIG. 3(c) illustrates coolant flow 55 from the tool holder (not shown) and through the coolant passage channel 56 defined between a coolant flow recess 51 of the cutting insert 50 and the fastener 53. A peripheral gap 61 that serves as a coolant outlet is defined between the top portion 62 of the fastener bore 52 and the bottom face 63 of the head portion 64 of the fastener 53. The bottom face 63 is specifically shaped to account for the type and configuration of the cutting insert 50 and thereby direct the coolant flow 55 precisely toward the cutting edge 65.

Figure 4:
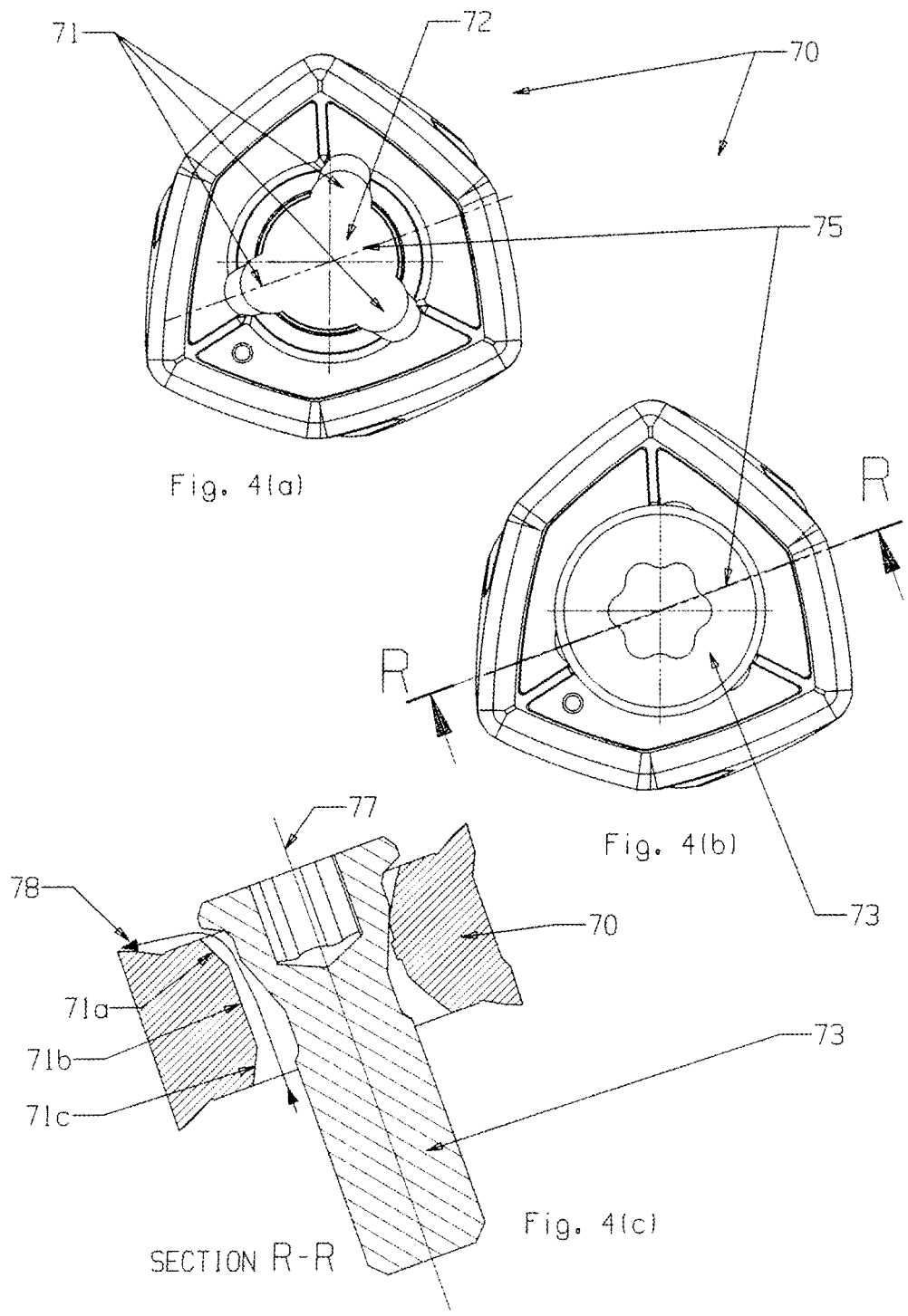
FIG. 4(a) is a schematic top view of a non-limiting embodiment of a double-sided milling cutting insert according to the present disclosure, including three coolant flow recesses, and including multiple coolant flow recess segments.
FIG. 4(b) is a schematic top view of the double-sided milling cutting insert of FIG. 4(a) and a fastener according to the present disclosure.
FIG. 4(c) is a schematic cross-section of a non-limiting embodiment of a cutting insert, and a fastener, revealing coolant flow recesses in the fastener bore of the cutting insert and coolant flow guided by a head portion.

FIGS. 4(a) through 4(c) depict another non-limiting embodiment of a double-sided milling cutting insert including an internal coolant system according to the present disclosure. FIG. 4(a) depicts a top view of the cutting insert 70, which includes three coolant flow recesses 71 defined along a wall of the fastener bore 72. FIG. 4(b) depicts a top view of cutting insert 70 and further depicts a fastener 73 disposed in the fastener bore 72. FIG. 4(c) is a sectional view of the cutting insert 70 and fastener 73 taken along line R-R (also identified as line 75) in FIG. 4(b). The cutting insert 70 is similar to the cutting insert 50 shown in FIGS. 3(a) through 3(c), but, as shown in FIG. 4(c), each coolant flow recess 71 of cutting insert 70 comprises multiple segments 71a, 71b and 71c. In the embodiment shown in FIG. 4(c), segment 71a forms an angle of less than 90° with the axis 77 of the fastener 73, segment 71b is substantially parallel to the axis 77 of the fastener 73, and segment 71c also forms an angle of less than 90° with the axis 77 of the fastener 73. FIG. 4(c) also indicates coolant flow 78 through the cutting insert 70, which is directed toward a cutting edge of the cutting insert 70 by a gap defined between a head portion of the fastener 73 and the cutting insert 70.

Figure 5:
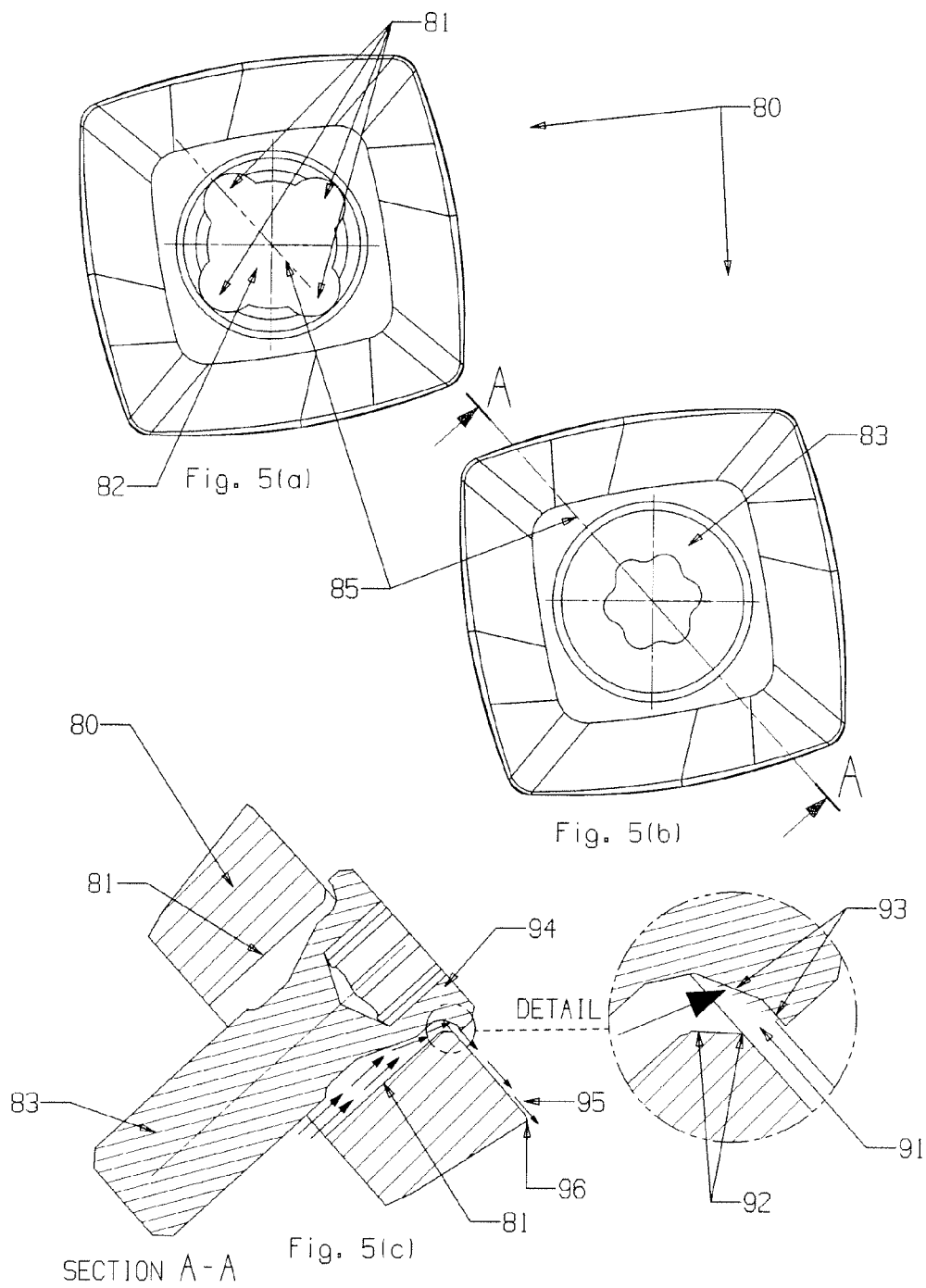
FIG. 5(a) is a schematic top view of a non-limiting embodiment of a single-sided milling cutting insert according to the present disclosure including four coolant flow recesses.
FIG. 5(b) is a schematic top view of the single-sided milling cutting insert of FIG. 5(a) and a fastener according to the present disclosure.
FIG. 5(c) is a schematic cross-section of a non-limiting embodiment of a cutting insert, and a fastener, revealing coolant flow recesses in the fastener bore of the cutting insert and coolant flow guided by a head portion.

FIGS. 5(a) through 5(c) illustrate a non-limiting embodiment of a single-sided milling cutting insert including an internal coolant system according to the present disclosure. FIG. 5(a) is a top view of the cutting insert 80 including four recesses 81 along the wall of the fastener bore 82. FIG. 5(b) is a top view of the cutting insert 80 and further depicts a fastener 83 disposed in the fastener bore 82. FIG. 5(c) is a sectional view of the cutting insert 80 and fastener 83 taken along line A-A (also identified as line 85) in FIG. 5(b). As shown in the detail section of FIG. 5(c), a peripheral gap 91 that functions as a coolant outlet is defined between a top portion 92 of the fastener bore 82 and the bottom face 93 of the head portion 94 of the fastener 83. The bottom face 93 is specifically shaped to interact with the top portion 92 of the fastener bore 82 and direct coolant flow 95 precisely towards cutting edge 96.

Figure 6:
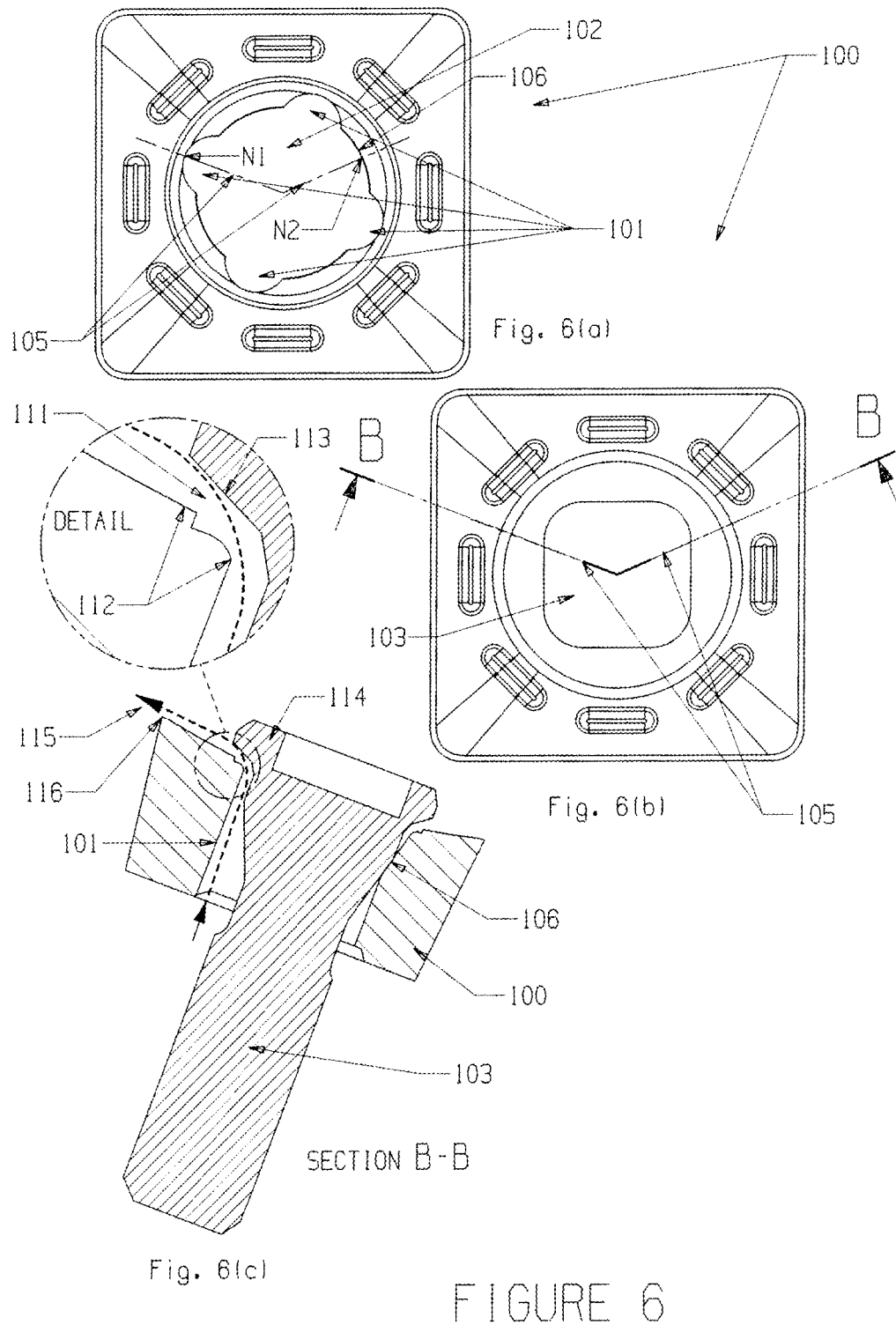
FIG. 6(a) is a schematic top view of a non-limiting embodiment of a single-sided cutting insert for boring operations according to the present disclosure including four coolant flow recesses.
FIG. 6(b) is a schematic top view of the single-sided cutting insert of FIG. 6(a) and a fastener according to the present disclosure.
FIG. 6(c) is a schematic folded section of a non-limiting embodiment of a cutting insert for boring operations, and a fastener, revealing coolant flow recesses in the fastener bore of the cutting insert and coolant flow guided by a head portion of the fastener.

FIGS. 6(a) through 6(c) illustrate a non-limiting embodiment of a single-sided boring cutting insert including an internal coolant system according to the present disclosure. FIG. 6(a) depicts a top view of the cutting insert 100 including four coolant flow recesses 101 along the wall of the fastener bore 102. FIG. 6(b) is a top view of the cutting insert 100 and further depicts a fastener 103 disposed in the fastener bore 102. FIG. 6(c) is a sectional view taken along B-B in FIG. 6(b) (i.e., the folded section line 105), which passes through a coolant flow recess 101 at point N1, changes direction at the center point of the cutting insert 100, and passes through the original fastener bore periphery 106 at point N2 (see FIG. 6(a)). A peripheral gap 111 that functions as a coolant outlet is defined between a top portion 112 of fastener bore 102 and a bottom face 113 of a head portion 114 of the fastener 103. The bottom face 113 is specifically shaped so that the coolant flow 115 is directed precisely towards the active cutting edge 116.

Figure 7:
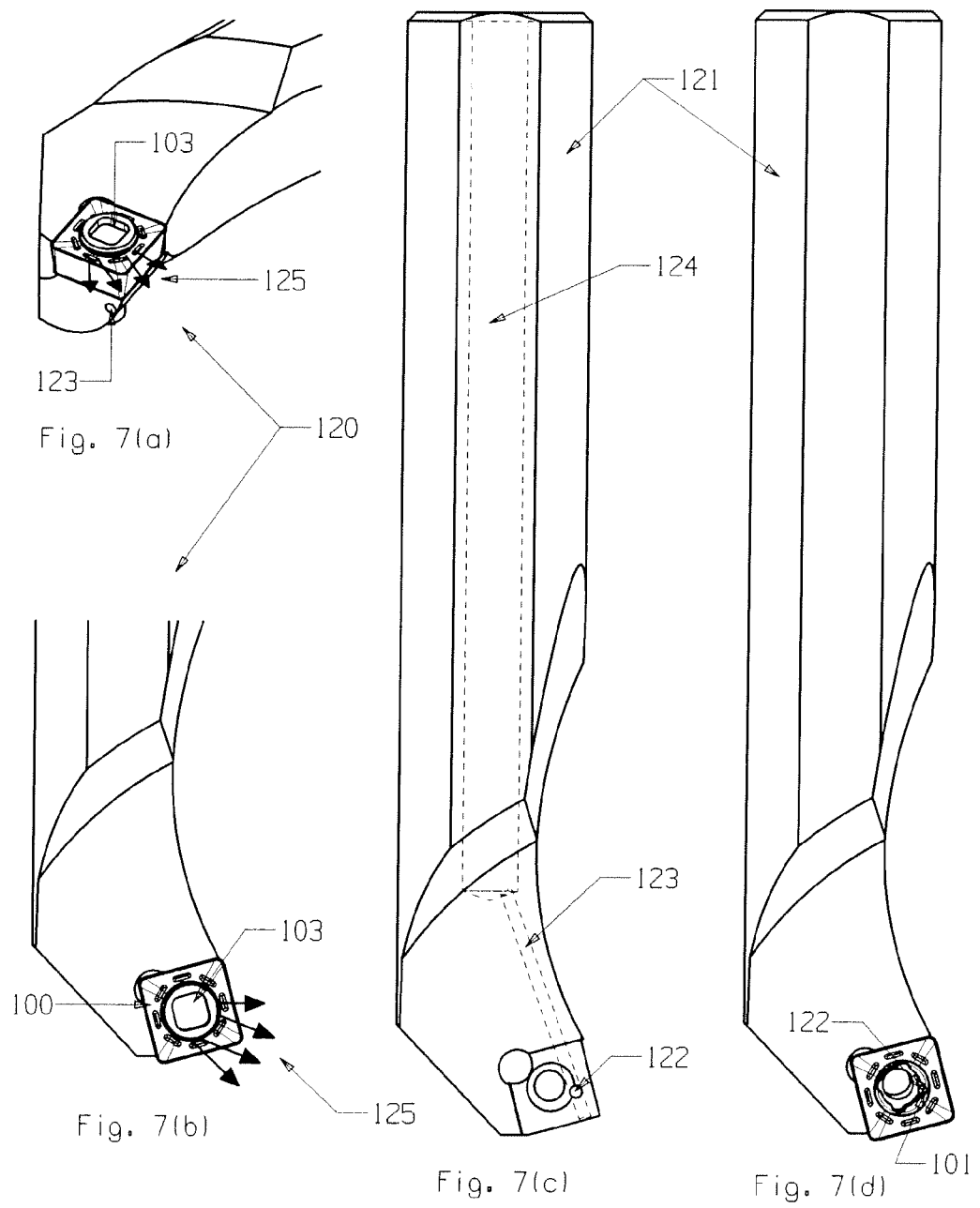
FIGS. 7(a) through 7(d) are schematic representations of a cutting tool system comprising a boring tool holder, a boring cutting insert, and a fastener according to FIGS. 6(a) through 6(c)

FIGS. 7(a) through 7(d) depict a non-limiting embodiment of a boring tool according to the present disclosure, wherein the boring tool 120 comprises a boring tool holder 121, a boring cutting insert 100 as presented in FIGS. 6(a) through 6(c), and a fastener 103 as shown in FIGS. 6(b) and 6(c). FIG. 7(a) is a perspective view of a working end of the cutting tool 120, with coolant flow 125 emerging between the fastener 103 and the cutting insert 100. FIG. 7(b) is a top view of a working end of the cutting tool 120 with coolant flow 125 emerging from between the fastener 103 and the cutting insert 100. FIG. 7(c) is a top view of the tool holder 121 (with the cutting insert 100 and the fastener 103 removed) showing internal coolant bores 122, 123, and 124 formed in the tool holder 121. FIG. 7(d) is a top view of the tool holder 121 and the cutting insert 100 showing the positional relationship between a coolant flow recess 101 and the fastener bore 122. As indicated in FIG. 7(c), coolant passes through bore 124 along the length of the tool holder 121, passes into bore 123, and emerges from bore 122 positioned on a surface of the insert pocket of the tool holder 121. As indicated in FIGS. 7(a), 7(b), and 7(d), coolant emerging from bore 122 passes through the interior of cutting insert 100 and emerges from a gap defined between the cutting insert 120 and the fastener 103 as coolant flow 125. In this way, coolant may be fed axially through the tool holder 121, introduced into the interior of the cutting insert 100, and directed towards a cutting edge of the cutting insert 100.

Figure 8:
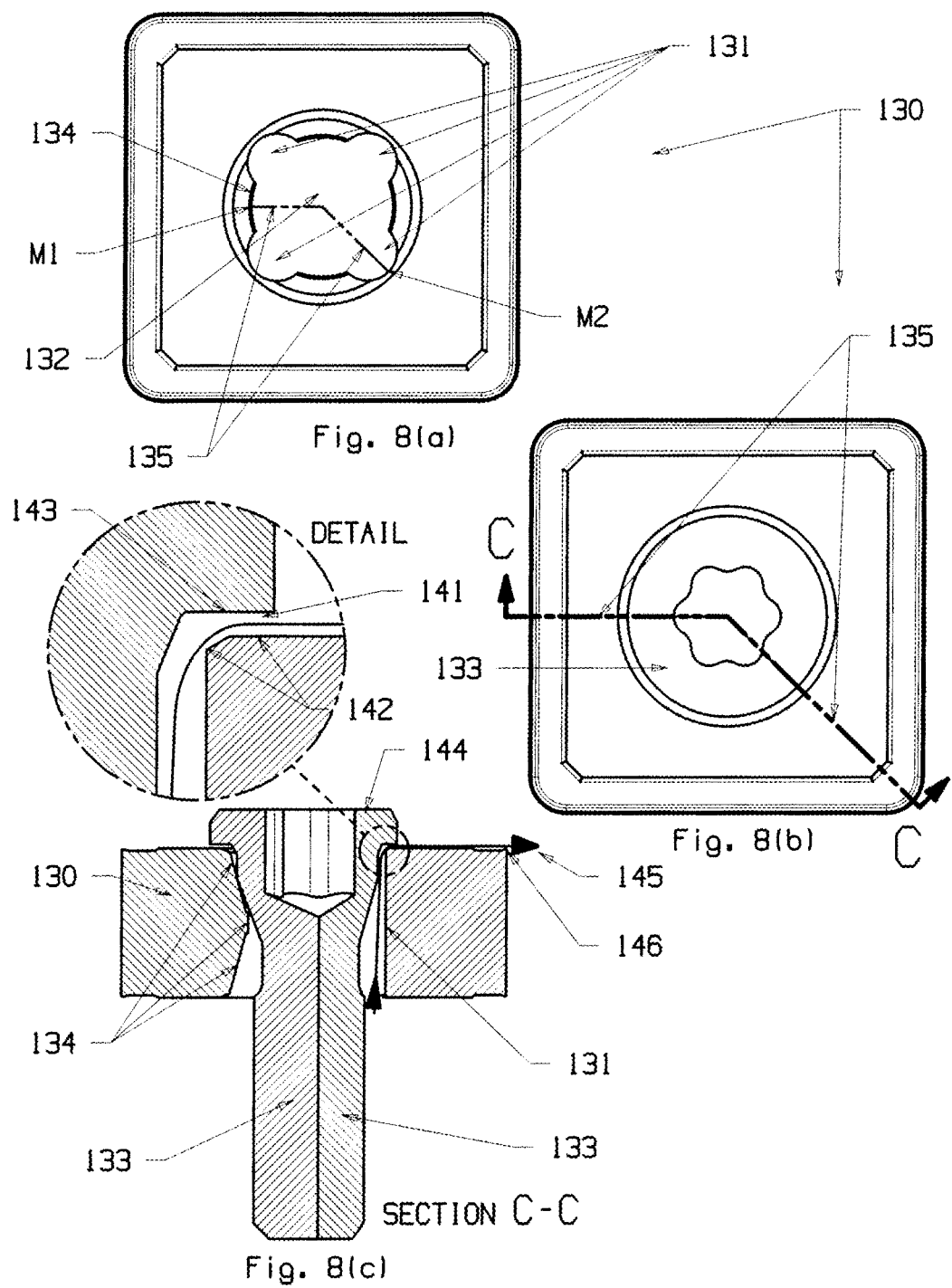
FIG. 8(a) is a schematic top view of a non-limiting embodiment of a double-sided turning cutting insert for turning operations according to the present disclosure including four coolant flow recesses.
FIG. 8(b) is a schematic top view of a non-limiting embodiment of the double-sided turning cutting insert of FIG. 8(a) and a fastener according to the present disclosure.
FIG. 8(c) is a schematic folded section of a non-limiting embodiment of a cutting insert for turning operations, and a fastener, revealing coolant flow recesses in the fastener bore of the cutting insert and coolant flow guided by a head portion of the fastener.

FIGS. 8(a) through 8(c) illustrate a non-limiting embodiment of a turning cutting insert 130 including an internal coolant system according to the present disclosure. FIG. 8(a) is a top view of the cutting insert 130 including four coolant flow recesses 131 formed along the wall of the fastener bore 132. FIG. 8(b) is a top view of cutting insert 130 and further depicts a fastener 133 disposed in the fastener bore 132. FIG. 8(c) is a sectional view taken along C-C in FIG. 8(b) (i.e., the folded section line 135), which passes through a coolant flow recess 131 at point M2, changes direction at the center point of the cutting insert 130, and passes through the original fastener bore periphery 134 at point M1 (see FIG. 8(a)). As shown in the detail section of FIG. 8(c), a peripheral gap 141 that functions as a coolant outlet is defined between the top portion 142 of the fastener bore 132 and the bottom face 143 of the head portion 144 of fastener 133. The bottom face 143 is specifically shaped to account for the type and configuration of the cutting insert 130 and direct the coolant flow 145 precisely towards the active cutting edge 146 of cutting insert 130. Contact between original fastener bore periphery 134 at M1 and the fastener 133 partially secures the fastener to an insert pocket of a tool holder.

Figure 9:
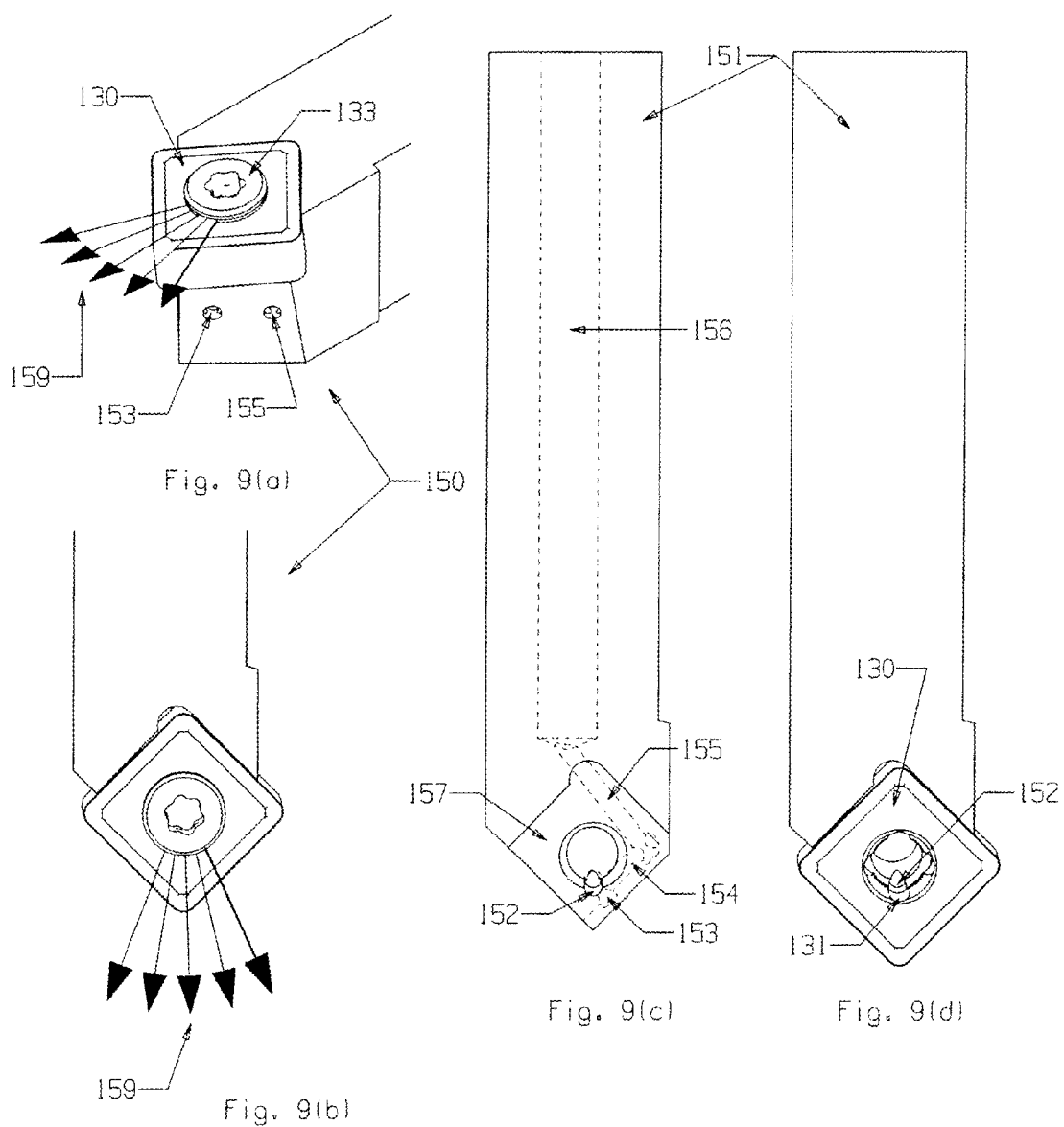
FIGS. 9(a) through 9(d) are schematic views of a non-limiting embodiment of a cutting tool system comprising a turning tool holder, a turning cutting insert, and a fastener according to FIGS. 8(a) through 8(c)

FIGS. 9(a) through 9(d) show a non-limiting embodiment of a cutting tool according to the present disclosure. Turning tool 150 comprises a turning tool holder 151, a turning cutting insert 130 as described in FIGS. 8(a) through 8(c), and a fastener 133 as described in FIGS. 8(b) and 8(c). FIG. 9(a) is a perspective view of the cutting tool 150, and FIG. 9(b) is a top view of a working end of the cutting tool 150, wherein both figures show coolant flow 159 directed from a peripheral gap 141 that functions as a coolant outlet and is defined between the head portion 144 of the fastener 133 and the cutting insert 130 (see FIG. 8(c)). FIG. 9(c) is a top view of the tool holder 151, with the cutting insert 130 and the fastener 133 removed, showing internal coolant bores 152, 153, 154, 155, and 156. FIG. 9(d) is a top view showing the tool holder 151 and the cutting insert 150 and indicating the positional relationship between one of the coolant flow recesses 131 (see FIG. 8) and coolant bore 152 which is perpendicular to the pocket seat face 157. The ends of the internal coolant bores 153, 154 and 155 may be blocked by set screws (not shown), to prevent flow of coolant from the bores.

FIGS. 10(a) through 10(c) illustrate another non-limiting embodiment of a drilling cutting insert 160 including an internal coolant system according to the present disclosure. FIG. 10(a) is a top view of the cutting insert 160 including four coolant flow recesses 161 along the wall of the fastener bore 162. FIG. 10(b) is a top view of cutting insert 160 and further depicts a fastener 163 disposed in the fastener bore 162. FIG. 10(c) is a sectional view taken along H-H in FIG. 10(b) (i.e., the folded section line 165), which passes through a coolant flow recess 161 at point L2, changes direction at the center point of the cutting insert 160, and passes through the original fastener bore periphery 164 at point L1 (see FIG. 10(a)). As shown in the detail portion of FIG. 10(c), a peripheral gap 171 that functions as a coolant outlet is defined between the top portion 172 of the fastener bore 162 and the bottom face 173 of the head portion 174 of the fastener 163. The bottom face 173 is specifically shaped to account for the type and configuration of the cutting insert 160 so that the coolant flow 175 is directed precisely towards the active cutting edge 176.

Further, as shown in FIG. 10(a) and FIG. 10(c), each coolant flow recess 161 comprises multiple segments 161a and 161b, wherein segment 161a defines an angle with the axis 177 of the fastener 163, while segment 161b defines an angel in the opposite direction with the axis 177 of the fastener 163.

Figure 10:
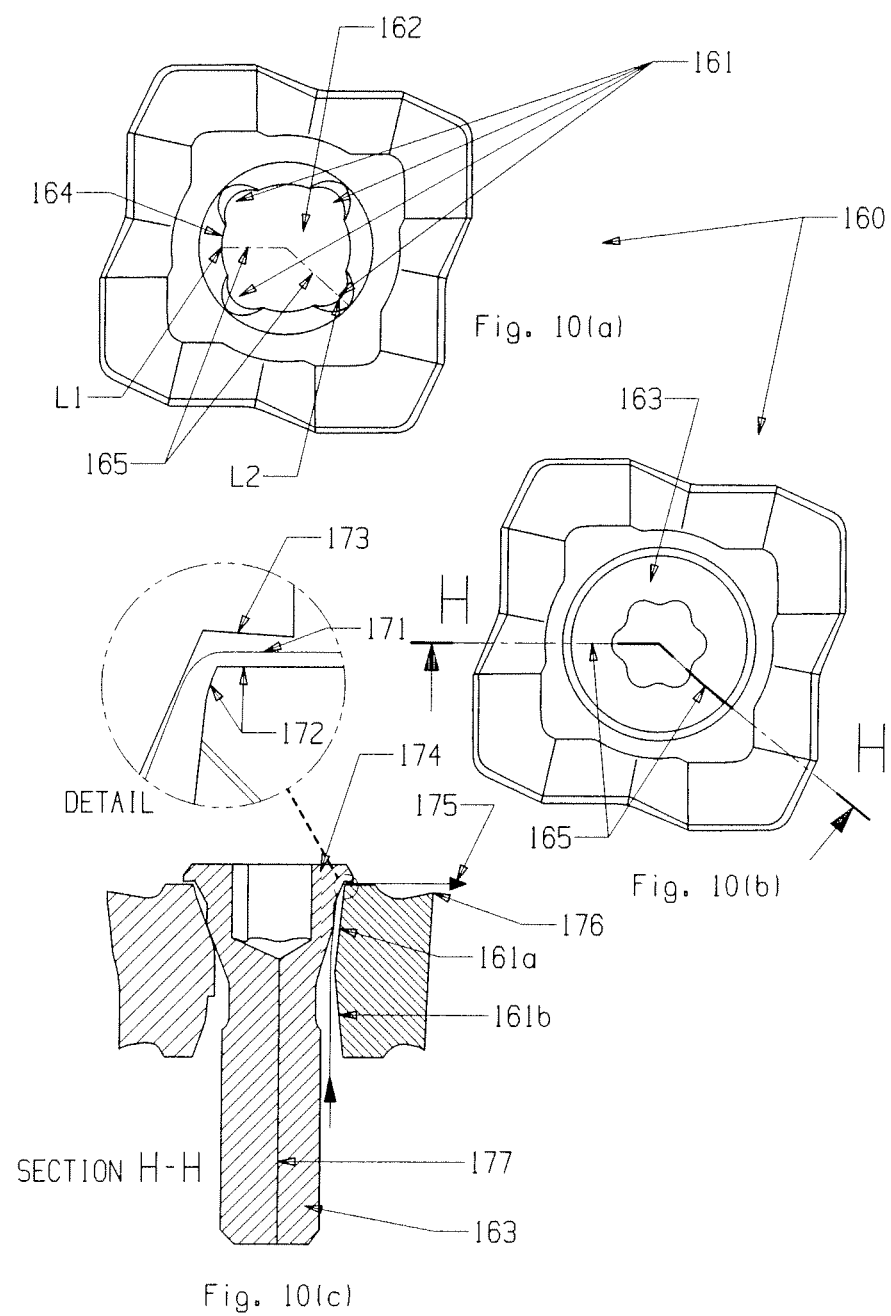
FIG. 10(a) is a schematic top view of a non-limiting embodiment of a double-sided drilling cutting insert for drilling operations according to the present disclosure including four coolant flow recesses.
FIG. 10(b) is a schematic top view of the double-sided drilling cutting insert for drilling operations of FIG. 10(a) and a fastener according to the present disclosure.
FIG. 10(c) is a schematic folded section of a non-limiting embodiment of a cutting insert for drilling operations, and a fastener, revealing coolant flow recesses in the fastener bore of the cutting insert and coolant flow guided by a head portion of the fastener.
Figure 11:
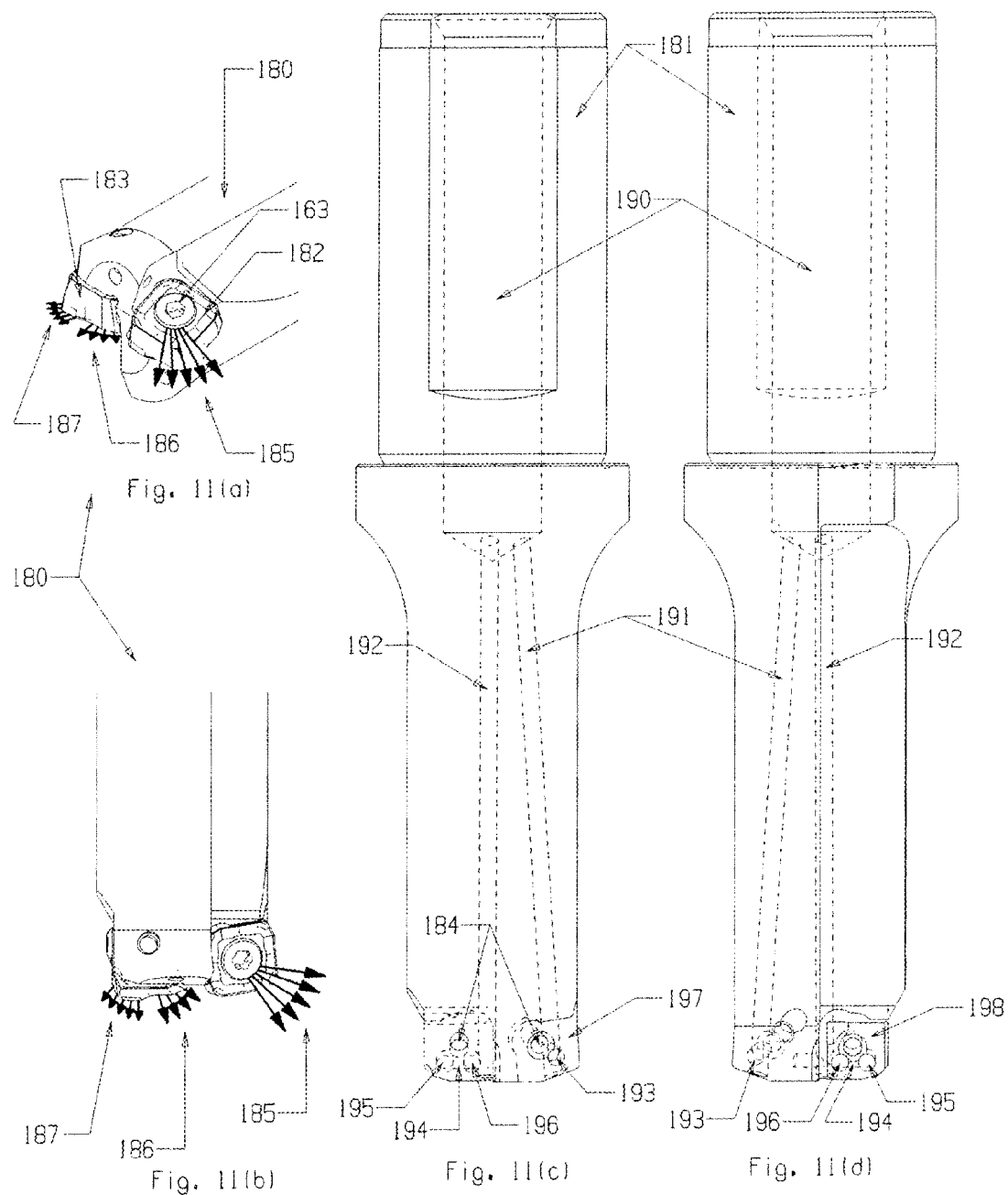
FIGS. 11(a) through 11(d) are schematic views of a non-limiting embodiment of an internal coolant system according to the present disclosure adapted for general machining operations.

FIGS. 11(a) through 11(d) show a non-limiting embodiment of a drilling tool 180 according to the present disclosure comprising a drilling tool holder 181, two drilling cutting inserts 182 and 183 (with the drilling insert 182 as a peripheral insert and the drilling insert 183 as a center insert), and two fasteners identical to fastener 163 shown in FIG. 10(c). The geometry and shape of the coolant flow recesses of both drilling cutting inserts 182 and 183 are the same as those of the drilling cutting insert 160 described in regards to FIGS. 10(a) through 10 (c). Each of the drilling cutting inserts 182 and 183 are secured by a fastener 163 threadedly received in a fastener bore in each cutting insert. FIG. 11(a) is a perspective view of the drilling tool 180, and FIG. 11(b) is a top view of the drilling tool 180. FIG. 11(c) is a top view of the tool holder 181 (wherein the pocket seat face 197 for seating the peripheral drilling insert 182 faces out of the page) showing internal coolant bores 190 through 196 passing through the tool holder 181 and exiting on the pocket seat faces. FIG. 11(d) is a bottom view of the tool holder 181 (wherein the pocket seat face 198 for seating the center drilling insert 183 faces out of the page) showing internal coolant bores 190 through 196 passing through the tool holder 181 and exiting on the pocket seat faces. As can been seen from FIG. 11(c) and FIG. 11(d), two coolant bores 195 and 196 (internally connected by coolant bore 194 from the pocket seat 198 of the tool holder 181) exit on the pocket seat for the center drill insert 183 and, therefore, two coolant flows 186 and 187 are directed toward cutting edges of the center drill insert. Only one coolant bore 193 exits on pocket seat 197 supporting the peripheral drill insert 182 and, therefore, only a single coolant flow 185 is directed to a cutting edge of the peripheral drill insert. However, if desired, the tool holder 180 can be easily modified to provide coolant flows from two or more coolant outlets to the peripheral drill insert 182.

Figure 12:
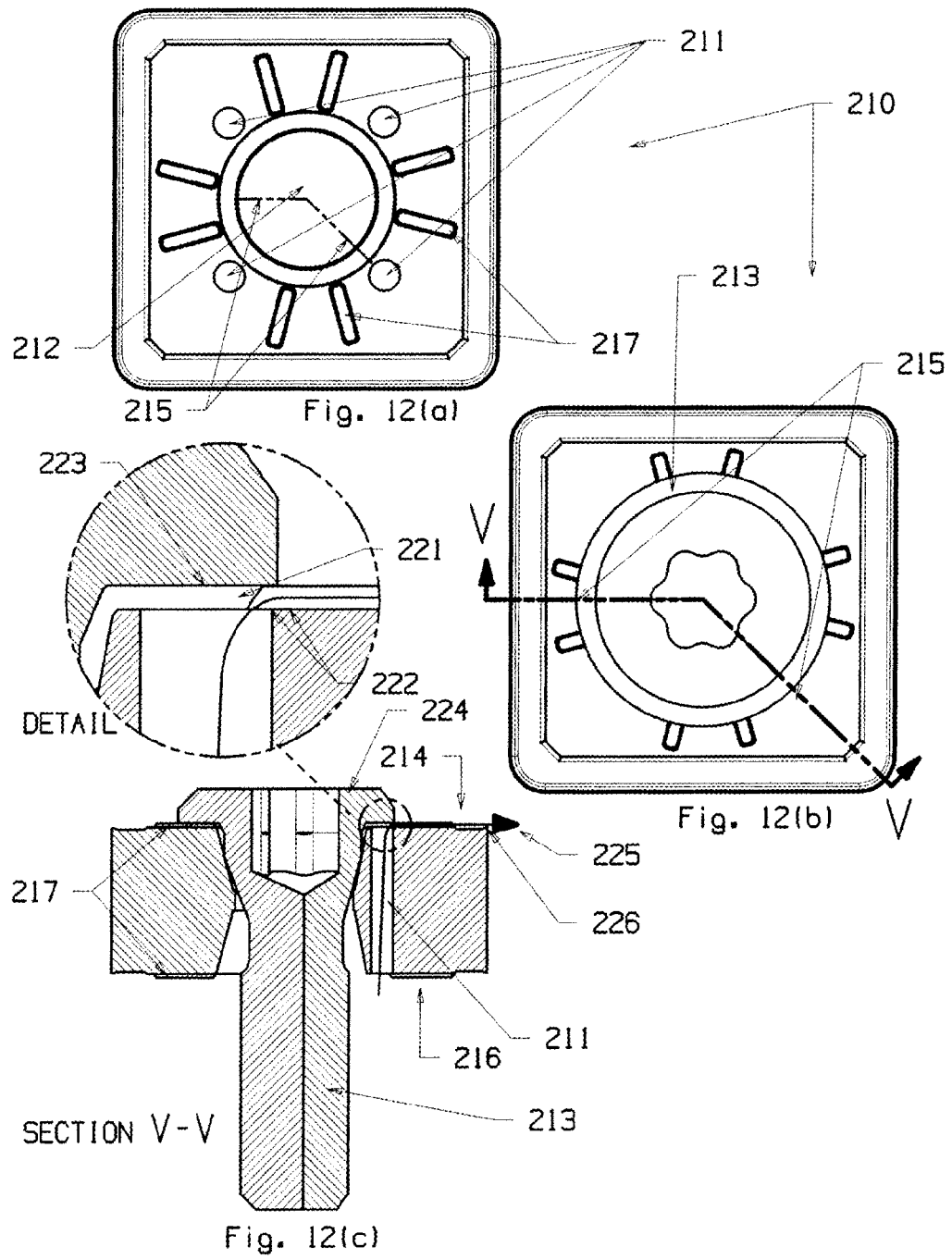
FIG. 12(a) is a schematic top view of a non-limiting embodiment of a cutting insert according to the present disclosure adapted for general machining operations and including four through cavities.
FIG. 12(b) is a schematic top view of the cutting insert of FIG. 12(a) and a fastener according to the present disclosure.
FIG. 12(c) is a schematic folded section of a non-limiting embodiment of a cutting insert for general machining operations, a fastener, and a portion of a tool holder according to the present disclosure, revealing through cavities in the cutting insert and coolant flow guided by a head portion of the fastener.

FIGS. 12(a) through 12(c) illustrate another non-limiting embodiment of a cutting insert including an internal coolant system and adapted for general machining operations according to this disclosure. FIG. 12(a) is a top view of cutting insert 210 including four through cavities 211 extending from top face 214 to bottom face 216 of the cutting insert 210 adjacent fastener bore 212. FIG. 12(b) is a top view of cutting insert 210 including a fastener 213 through fastener bore 212. FIG. 12(c) is a sectional view taken along V-V in FIG. 12(b) (i.e., the folded section line 215), which passes through a through cavity 211, changes direction at the center point of the cutting insert 210, and passes through a section of the cutting insert 210 that does not include a through cavity 211. Further, each through cavity 211 includes a pair of side extrusions 217 flanking each through cavity 211 on both top and bottom faces 214,216, and with function as side blocks to limit coolant flow 225. A gap 221, which functions as a coolant outlet 221, is defined between the top portion 222 of a through cavity 211 and a bottom face 223 of a head portion 224 of the fastener 213. The bottom face 223 is specifically shaped to account for the type and configuration of the cutting insert 210 so that the coolant flow 225 is directed precisely towards an active cutting edge 226. Further, the side extrusions 217 on the cutting insert 210 define a small gap with the bottom face 223 of the head portion 224 once secured on a tool holder by the fastener 213. In certain non-limiting embodiments, the through cavities 211 are drilled (in the case of being a cylindrical hole) prior to furnace sintering the cutting insert 210. Alternatively, and without limitation, the through cavities may be built into the tooling dies and created when the cutting insert 210 is pressed in a mold or extruded in a powder injection machine. The through cavities 211 may have any suitable geometry including, but not limited to, a circle, an ellipse, lines, curve(s), spline(s), polygons, and combinations of any of those geometries.

FIGS. 13, 14(a), 14(b), 15(a), and 15(b) depict certain non-liming embodiments of a fastener 250 adapted to secure a cutting insert (not shown) to a tool holder (not shown). Fastener 250 includes a head portion 252 (i.e., an end). Head portion 252 includes at least one feature adapted to direct a coolant fluid toward a cutting edge of a cutting insert. In a non-limiting embodiment according to the present disclosure, the at least one feature of the head portion 252 includes a recess 254 adapted to direct a coolant fluid toward a cutting edge of a cutting insert secured to a tool holder by the fastener 250.

Figure 15A:
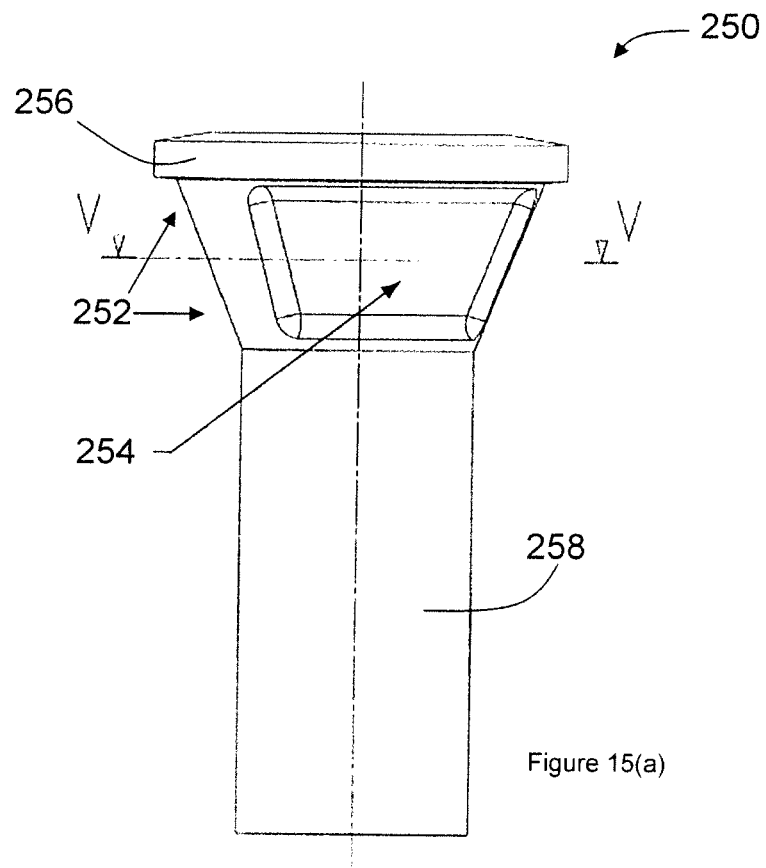
FIG. 15(a) is a side view of a non-limiting embodiment of a fastener according to the present disclosure comprising a recess on a head portion of the fastener.
Figure 15:
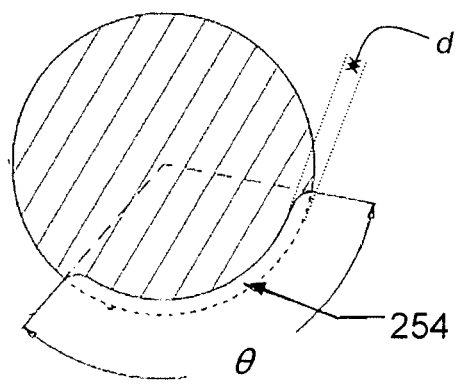
FIG. 15(b) is a cross-sectional view of the fastener depicted in FIG. 15(a) taken at line V-V in FIG. 15(a)

In a non-limiting embodiment recess 254 of fastener 250 extends peripherally on the head portion 252 in the range of about 30 degrees to about 180 degrees. In FIG. 15(b), the distance to which the recess extends peripherally about the head portion is indicated by a recess angle θ. FIG. 15(b) depicts a cross-section through fastener 254 taken at line V-V in FIG. 15(a) and passes laterally through the recess 254. In another non-limiting embodiment, the recess 254 extends peripherally on the fastener head portion 252 a length corresponding to a recess angle θ in the range of about 45 degrees to about 120. A recess that extends entirely around the head portion 252 corresponds to a recess angle of 360°. The recess on the head portion of the fastener may have any depth and shape suitable to direct a flow of coolant toward the cutting edge of a cutting insert secured to a tool holder by the fastener. In the non-limiting embodiment of fastener 254, for example, the recess depth, which is the distance d in FIG. 15(*b*), may be about 0.1 mm, or about 0.27 mm. In a non-limiting embodiment according to the present disclosure, the recess depth is in a range from about 0.05 mm to about 0.5 mm. One having ordinary skill, on reading the present disclosure, may, without undue experimentation, design a recess on the head portion of a cutting insert fastener having a length, depth, and shape suitable to direct a cutting fluid toward a cutting edge of a cutting insert secured to a suitably designed tool holder by the fastener.

During a cutting operation, the recess 254 is positioned adjacent to an active cutting edge of a cutting insert. A cutting edge is "active" if it is positioned on a tool holder so as to contact and machine a workpiece during a machining operation. This will be described in greater detail hereinbelow. A function of the recess 254 on the head portion 252 of the fastener 250 is to direct coolant fluid toward the active cutting edge of a cutting insert secured to a tool holder by the fastener 250. Therefore, it will be understood that the recess shape, recess dimensions, recess angle, and/or the number of recesses on the head portion of the fastener may be varied from what is disclosed herein and in the accompanying Figures, and further that a person skilled in the art would be able to modify the various attributes of a recess to allow a fastener according to the present disclosure to be used with a specific cutting insert and tool holder without undue experimentation. The recess 254 depicted in the non-limiting embodiments of FIGS. 13, 14(*a*), and 15(*a*) has a generally polygonal periphery. However, it is recognized that recesses with peripheries having other shapes, such as rectangular, square, oval, irregular, and circular, for example, may be used. More generally, a fastener including a recess having any peripheral shape useful to direct coolant toward a cutting edge of a cutting insert secured to a tool holder by the fastener is within the scope of the present disclosure.

Again referring to the figures, at least one feature of the head portion 252 adapted to direct a coolant fluid toward a cutting edges of a cutting insert optionally comprises a lip portion 256. In certain non-limiting embodiments, the lip portion 256 also is adapted to direct a flow of coolant toward a cutting edge of a cutting insert secured to a tool holder by a fastener including the head portion 252 and lip portion 256. In certain non-limiting embodiments, a fastener according to the present disclosure includes a head portion comprising both a recess and a lip portion, which are adapted to work together to direct a flow of coolant toward a cutting edge of a cutting insert secured to a tool holder by the fastener.

Figure 13:
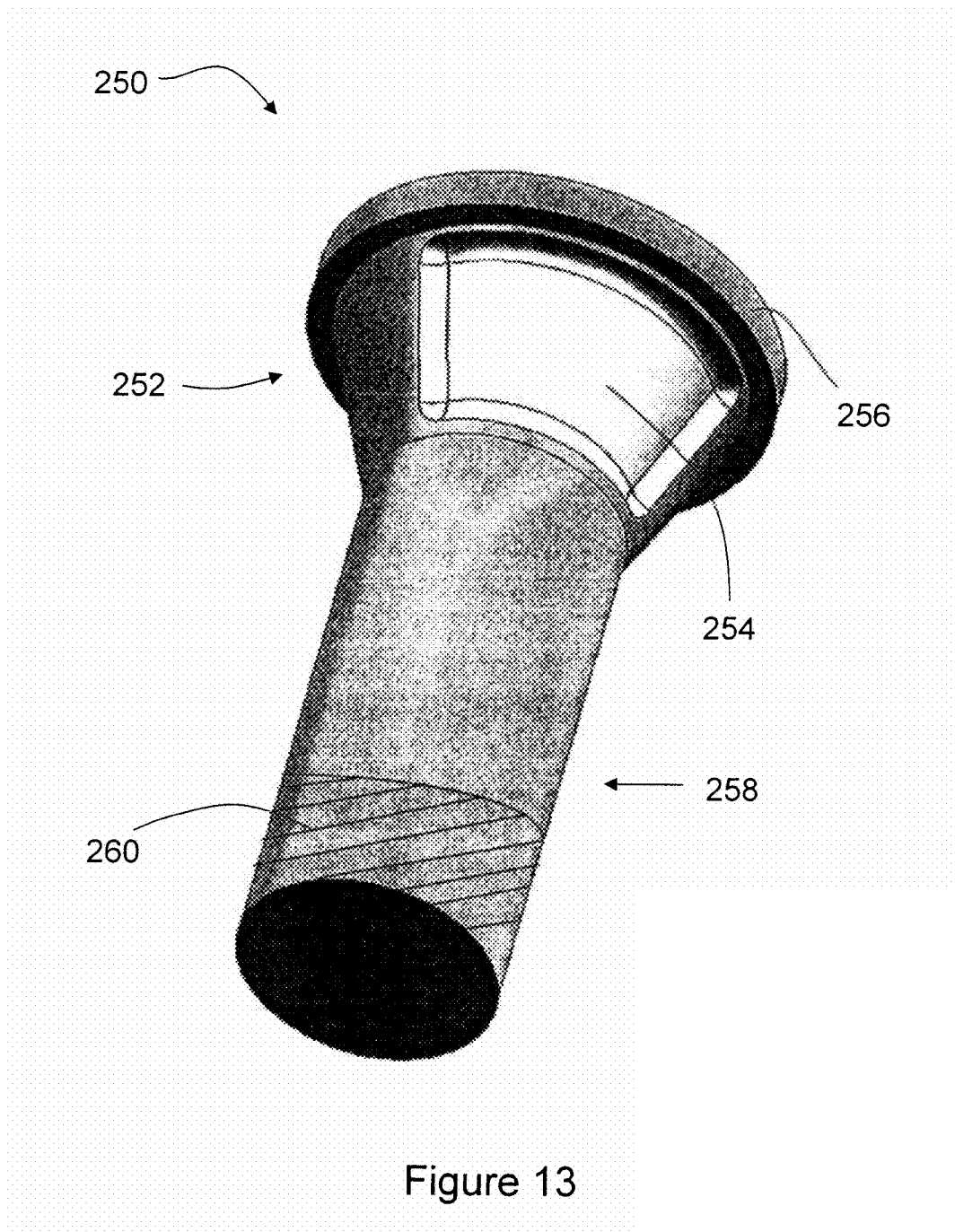
FIG. 13 is a perspective view of a non-limiting embodiment of a fastener according to the present disclosure comprising a recess on a head portion of the fastener adapted to direct coolant toward a cutting edge of a cutting insert.
Figure 17:
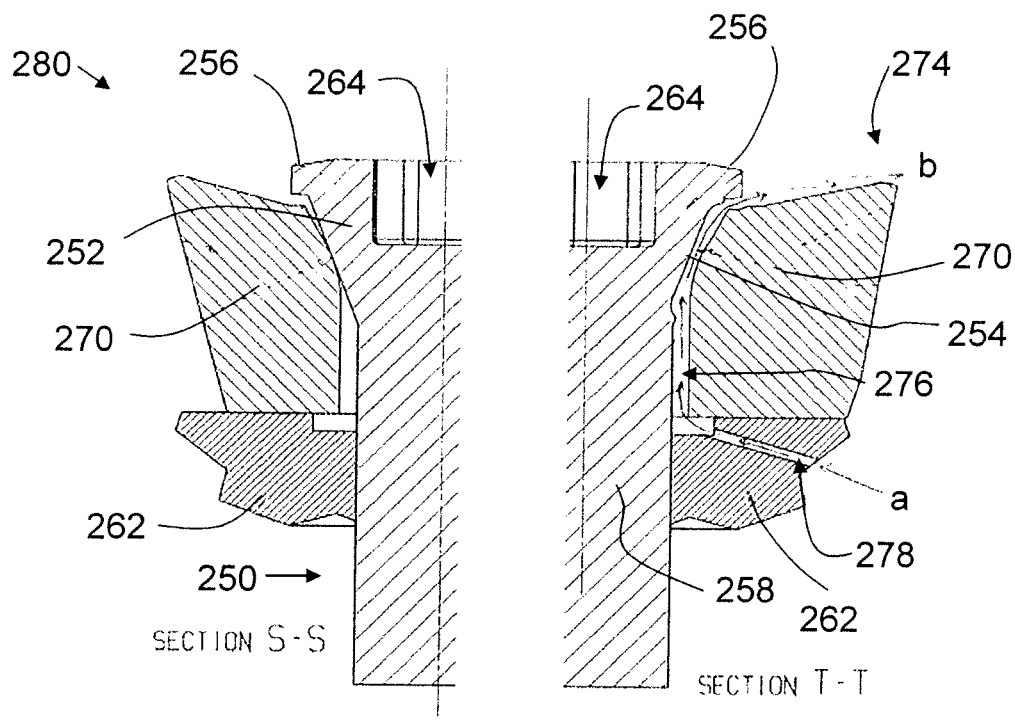
FIG. 17(a) includes two cross-sectional views of regions of a non-limiting embodiment of a cutting tool according to the present disclosure comprising a cutting insert and a fastener including head portion comprising a recess and a lip portion.
FIG. 17(b) is a top view of the cutting tool shown in two cross-sectional views in FIG. 17(a).
Figure 17:
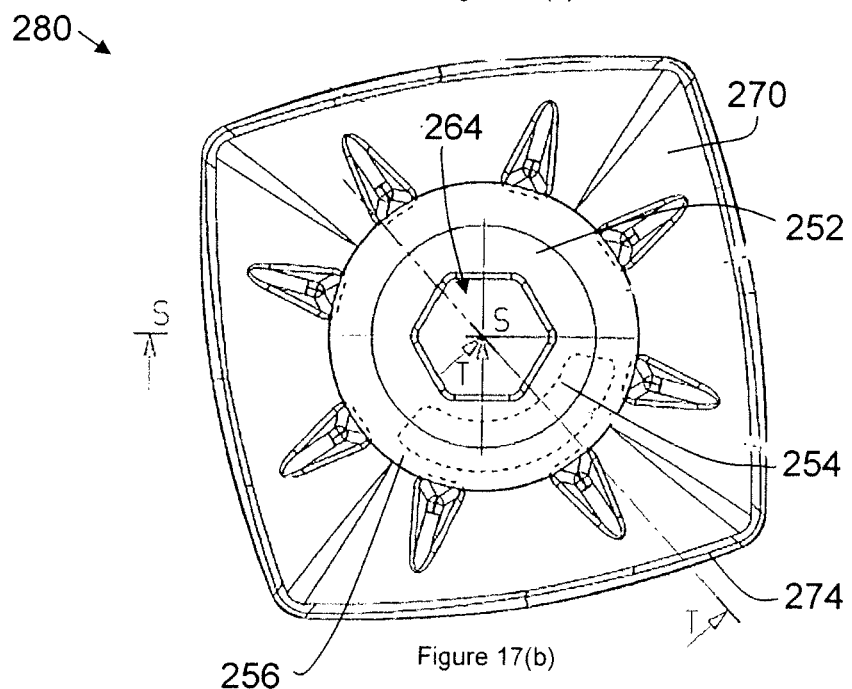

Referring now to FIGS. 13, 14(*a*), 14(*b*), 15(*a*), 15(*b*) 16(*a*)-16(*c*), 17(*a*), and 17(*b*), in a non-limiting embodiment, fastener 250 further comprises an axial fastening portion 258 adapted to secure the fastener 250 to a tool holder, such as tool holder 262 shown in FIG. 17(*a*). At least a portion of the axial fastening portion 258 of the fastener 250 may include threads 260 to threadedly secure the fastener 250 to the tool holder. However, it will be understood that a fastener according to the present disclosure may include an axial fastening portion, such as portion 258, adapted in any way suitable to secure the fastener to a tool holder to thereby secure a cutting insert to the tool holder. All such alternate embodiments are within the scope of this disclosure.

A fastener according to this disclosure optionally includes other features conventionally provided as features of cutting insert fasteners to facilitate securing a cutting insert to a tool holder. For example, a fastener may include a hexagonal, or any other polygonal recess 264 in the head portion 252 to accommodate a hex wrench for securing the fastener to the tool holder. As suggested in the view shown in FIG. 17(*a*), securing the fastener 250 to the tool holder 262 also secures cutting insert 270 to the tool holder 262.

Referring now to FIGS. 16(*a*)-16(*c*), 17(*a*), and 17(*b*), certain novel functional aspects of a fastener according to this disclosure, along with certain other aspects of cutting inserts and tool holders, are disclosed. A perspective view and a top view of an embodiment of a conventional cutting insert 270 are presented in FIGS. 16(*a*) and 16(*b*), respectively. FIG. 16(*c*) is a cross-sectional view of the cutting insert 270 taken at line U-U in FIG. 16(*b*). Cutting insert 270 includes a fastener bore 272 and a cutting edge 274. Cutting insert 270 is an indexable insert including four indexable cutting edges 274*a*-274*d*. As is known in the art, when a particular cutting edge, for example, cutting edge 274*a* becomes dull or unusable, the indexable cutting insert 270 can be rotated, or indexed, in the insert pocket of a tool holder to position another cutting edge (e.g., 274*b*) to contact the workpiece during machining operations. Although the accompanying figures depict the cutting insert 270 as an indexable, square-shaped, single-sided cutting insert, it will be apparent to one considering the present disclosure that the novel fastener discussed herein may be adapted for use with other cutting insert types. Such other cutting insert types include, for example, round inserts, triangular inserts, trigonal inserts, pentagonal inserts, hexagonal inserts, octagonal inserts, double-sided inserts, and non-indexable inserts.

Referring to FIGS. 17(*a*) and (*b*), in a non-limiting embodiment of a cutting tool 280 according to the present disclosure, when the fastener 250 is positioned through a fastener bore 272 of cutting insert 270 and secures the cutting insert 270 to tool holder 262, at least a portion of the axial fastening portion 258 of fastener 250 and at least a portion of the fastening bore 272 together define a cavity 276. The cavity fluidly communicates with a coolant bore 278 in tool holder 262. As shown by the series of arrows running from the positions "a" and "b" in FIG. 17(*a*), coolant bore 278 and cavity 276 provide a continuous through passage for coolant. Features of the head portion 252 of the fastener 250, such as recess 254 and/or lip portion 256, direct the flow of coolant that passes from coolant bore 278 and through cavity 254 toward a cutting edge 274 of the cutting insert 270.

Thus, for example, referring again to the non-limiting embodiment of a cutting tool 280 depicted in FIGS. 17(*a*) and 17(*b*), when conventional cutting insert 270 is secured by fastener 250 to tool holder 262 including coolant bore 278, and when the fastener's head portion 252, which includes recess 254 and/or lip portion 256, are properly positioned, coolant flows from the at least one coolant bore 278, through cavity 276 defined between the fastener 250 and the fastener bore 272, and is directed by recess 254 and/or lip portion 256 toward cutting edge 274. In FIG. 17(*a*), the region of cutting edge 274 toward which coolant is directed is an active cutting edge region, and the flow of coolant reduces the temperature and the intensity of thermal cycling at the active cutting edge region.

The general position of recess 254 with respect to cutting insert 270 and tool holder 262 useful to direct coolant flow toward cutting edge in action 274 is depicted in the right-hand portion of FIG. 17(*a*), which is a cross-section taken along line T-T shown in FIG. 17(*b*). When the fastener 250 and cutting insert 270 are positioned in one region of the cutting tool 280 as shown in the cross-section T-T, the relative positions of the fastener 250 and cutting insert 270 in another region of the cutting tool 280 are as shown in section S-S, which is on the left-hand side of FIG. 17(a). In section S-S, a continuous cavity is not formed between the axial fastening portion 258 of the fastener 250 and, therefore, a flow of coolant is not directed toward a cutting edge of the cutting insert 270 at that section.

In a non-limiting embodiment according to this disclosure, the cavity 276 can be provided by designing the axial fastening portion 258 of the fastener 250 so that it has a diameter in at least certain regions that is smaller than a diameter of the fastening bore 272 of the cutting insert 270. It will be recognized that the dimensions of the recess 254, the coolant bore 278, and the cavity 276 may be varied to provide for a larger or smaller rate of coolant flow to the cutting edge. In certain non-limiting embodiments, for example, the depth of the recess 254 on the head portion 252 ranges from 0.05 mm to 1.0 mm, depending on the size of the cutting insert, as well as the size of the fastener 250 itself.

Table 1 lists various non-limiting examples of combinations of fastener head recess depths, axial fastening portion diameters, and fastener bore diameters that may be used in embodiments of cutting tools constructed according to the present disclosure. It will be recognized that the dimensions listed in Table 1 are not exclusive and may be varied, for example, to provide for a rate of coolant flow to the cutting edge that may be desirable or necessary when using specific cutting inserts or machining parameters.

TABLE 1

| Example | d - fastener head recess depth (mm) | axial fastening portion diameter (mm) | fastener bore diameter (mm) |
| --- | --- | --- | --- |
| 1 | 0.27 | 4 | 4.8 |
| 2 | 0.10 | 4 | 4.8 |
| 3 | 0.20 | 3 | 3.8 |
| 4 | 0.05 | 3 | 3.8 |

Still referring to FIGS. 17(a) and 17(b), and as discussed above, when a region of the head portion 252 of fastener 250 is not positioned opposite an active cutting edge, as in cross section S-S, coolant flow is blocked by the head portion 252 of the fastener 250. In the embodiment shown in FIGS. 17(a) and 17(b), coolant can only emerge between the head portion 252 and the cutting insert 270 in regions in which the recess 254 is present in head portion 252.

Referring again to the non-limiting embodiment depicted in FIGS. 16(a)-16(c) and 17(a)-(b), an aspect according to the present disclosure is directed to cutting tool 280 including an internal coolant system. The cutting tool 280 comprises at least one conventional cutting insert 270, a tool holder 262 (partially shown), and at least one fastener 250. The cutting insert 270 comprises at least one cutting edge 274 and at least one fastener bore 272 adapted to accept a fastener 250 to removably fasten the cutting insert 270 to the tool holder 262. The at least one fastener bore 272 and the fastener 250 define at least one cavity 276 to allow a coolant to flow through the cutting insert 270 and toward a head portion 252 of the fastener when the cutting insert 270 is secured to the tool holder 262 by the fastener 250. In a non-limiting embodiment, the tool holder 262 comprises at least one coolant bore 278 adapted to convey a coolant from the tool holder 262 to the cavity 276. In a non-limiting embodiment according to this disclosure, a head portion 252 of the fastener 250 comprises at least one feature adapted to direct the coolant toward a cutting edge 274 of the cutting insert 270. In a non-limiting embodiment according to the present disclosure, the at least one feature of the head portion 252 adapted to direct the coolant toward a cutting edge 274 of the cutting insert 270 includes a recess 254. In another non-limiting embodiment, the at least one feature of the head portion 252 adapted to direct the coolant toward a cutting edge 274 of the cutting insert 270 head portion further comprises a lip portion 256.

In non-limiting embodiment of a cutting tool according to the present disclosure, the cutting insert comprises a substrate including one or more of a high speed steel, cobalt alloy, a cemented carbide, a cermet, a ceramic, and a diamond.

In other non-limiting embodiments of a cutting tool according to the present disclosure, the recess of the head portion of the fastener extends peripherally from about 30 degrees to about 180 degrees on the head portion, or from about 45 degrees to about 120 degrees on the head portion.

In another non-limiting embodiment of a cutting tool according to the present disclosure, the cutting insert comprises a wear coating. Wear coatings may comprise one or more of, but are not limited to, titanium nitride, titanium carbide, aluminum oxide, silicon nitride, and zirconium oxide.

In still another non-limiting embodiment a cutting tool according to the present disclosure is one of a milling tool, a boring tool, a turning tool, a drilling tool, and a general machining tool. However, it will be apparent that the invention may be adapted for use with any cutting tool including a cutting insert secured to a tool holder by a fastener.

Another non-limiting embodiment of a cutting tool according to the present disclosure comprises a fastener 250 including at lease one recess 254 on a head portion thereof, as disclosed hereinabove, and a cutting insert comprising one or more coolant flow recesses such as, for example, the coolant recesses 11 of the cutting insert 10 shown in FIG. 1.

In certain non-limiting embodiments according to the present disclosure, the fastener may be selected from a screw, a bolts, a clamp, a pin, a rivet, and any other fasteners known now or heretofore to a person skilled in the art suitable for securing a cutting insert to a tool holder. Possible materials of construction for such fasteners include, for example, steel, stainless steel, titanium, titanium alloy, and any other materials having mechanical properties, corrosion resistance, and other characteristics suitable for use in securing a cutting insert to a tool holder and for directing a coolant toward a cutting edge.

The present disclosure has been written with reference to various exemplary, illustrative, and non-limiting embodiments. However, it will be recognized by persons having ordinary skill in the art that various substitutions, modifications, or combinations of any of the disclosed embodiments (or portions thereof) may be made without departing from the scope of the invention as defined solely by the claims. Thus, it is contemplated and understood that the present disclosure embraces additional embodiments not expressly set forth herein. Such embodiments may be obtained, for example, by combining and/or modifying any of the disclosed steps, ingredients, constituents, components, elements, features, aspects, and the like, of the embodiments described herein. Thus, the present disclosure is not limited by the description of the various exemplary, illustrative, and non-limiting embodiments, but rather solely by the claims. In this manner, it will be understood that the claims may be amended during prosecution of the present patent application to add features to the claimed invention as variously described herein.

We claim:

1. A fastener adapted to secure a cutting insert to a tool holder, the cutting insert having a top face, a fastening bore and a cutting edge, the fastener comprising:

a head portion at least partially disposed within the fastening bore of the cutting insert, the head portion, comprising:
    a frustom-shaped sealing surface; and
    a recess extending radially inward from the frustom-shaped sealing surface; and
an axial fastening portion adapted to secure the fastener to a tool holder when the fastener is positioned through the fastening bore of the cutting insert, and wherein a cavity is defined by at least a portion of the axial fastening portion of the fastener and at least a portion of the fastening bore of the cutting insert when the axial fastener portion secures the cutting insert, and wherein the cavity is in fluid communication with a coolant bore in the tool holder such that a coolant fluid passes from the coolant bore, through the cavity, and is directed by the recess onto the top face and toward the cutting edge of the cutting insert.

2. The fastener of claim 1, wherein the head portion further comprises a lip portion adapted to direct a coolant fluid toward a cutting edge of a cutting insert secured to a tool holder by the fastener.

3. The fastener of claim 1, wherein the recess extends peripherally from 30 degrees to 180 degrees on the head portion.

4. The fastener of claim 1, wherein the recess extends peripherally from 45 degrees to 120 degrees on the head portion.

5. The fastener of claim 1, wherein the recess fluidly communicates with a coolant bore of a tool holder when the fastener secures a cutting insert to the tool holder.

6. The fastener of claim 1, wherein at least a portion of the axial fastening portion includes threads to secure the fastener to the tool holder.

7. The fastener of claim 1, wherein:
    the recess is in fluid communication with the fastening bore of the cutting insert and at least one coolant bore of the tool holder.

8. The fastener of claim 6, wherein:
    at least a distal portion of the axial fastening portion comprises threads adapted to threadedly secure the fastener to the tool holder.

9. The fastener of claim 1, wherein the head portion includes the recess and a lip portion adapted to work together to direct a coolant fluid toward a cutting edge of a cutting insert secured to a tool holder by the fastener.

10. A cutting tool comprising:
    a tool holder including a coolant bore;
    a cutting insert including a top face and a cutting edge and a fastening bore, wherein the fastening bore comprises a frustom-shaped first mating surface; and
    a fastener adapted to secure the cutting insert to the tool holder, the fastener comprising a head portion at least partially disposed within the fastening bore of the cutting insert and an axial fastening portion adapted to secure the fastener to a tool holder;
    wherein when the cutting insert is secured to the tool holder by passing the axial fastening portion through the fastening bore, the fastening bore and the fastener define a cavity fluidly communicating with the coolant bore and adapted to direct a coolant through the cutting insert and toward the head portion;
    wherein the head portion comprises:
    a frustom-shaped second mating surface structured to securely abut a portion of the frustom-shaped first mating surface of the fastening bore when the fastener is secured through the fastening bore; and
    a recess extending radially inward from the frustom-shaped second mating surface, wherein the recess opens directly to the top face of the cutting insert so as to direct a coolant fluid onto the top face and toward the cutting edge of the cutting insert.

11. The cutting tool of claim 10, wherein the head portion further comprises a lip portion adapted to direct coolant from the cavity toward the cutting edge when the cutting insert is secured to the tool holder by securing the fastener through the fastening bore.

12. The cutting tool of claim 10, wherein the cutting insert comprises a substrate comprising one or more of a high speed steel, a cobalt alloy, a cemented carbide, a cermet, a ceramic, and a diamond.

13. The fastener of claim 10, wherein the recess extends peripherally from 30 degrees to 180 degrees on the head portion.

14. The cutting tool of claim 10, wherein the recess extends peripherally from 45 degrees to 120 degrees on the head portion.

15. The cutting tool of claim 10, wherein the cutting insert comprises a wear coating.

16. The cutting tool of claim 15, wherein the wear coating comprises at least one of titanium nitride, titanium carbide, aluminum oxide, silicon nitride, and zirconium oxide.

17. The cutting tool of claim 10, wherein the cutting tool is one of a milling tool, a boring tool, a turning tool, a drilling tool, and a general machining tool.

18. The cutting tool of claim 10, wherein the fastening bore of the cutting insert comprises a recess, and the fastening bore and the fastener define a cavity fluidly communicating with the coolant bore and adapted to direct a coolant through the cutting insert and toward the head portion when the cutting insert is secured to the tool holder by the fastener.

19. The cutting tool of claim 10, wherein the head portion includes the recess and a lip portion adapted to work together to direct a coolant fluid toward a cutting edge of the cutting insert secured to the tool holder by the fastener.

* * * * *